United States Patent
Yi et al.

(10) Patent No.: US 11,481,422 B2
(45) Date of Patent: Oct. 25, 2022

(54) METHOD AND SYSTEM FOR SENTIMENT ANALYSIS OF INFORMATION

(71) Applicant: HITHINK ROYALFLUSH INFORMATION NETWORK CO., LTD., Zhejiang (CN)

(72) Inventors: Zheng Yi, Hangzhou (CN); Wei Xia, Hangzhou (CN)

(73) Assignee: HITHINK ROYALFLUSH INFORMATION NETWORK CO., LTD, Hangzhou (CN)

( * ) Notice: Subject to any disclaimer, the term of this patent is extended or adjusted under 35 U.S.C. 154(b) by 74 days.

(21) Appl. No.: 17/086,469

(22) Filed: Nov. 2, 2020

(65) Prior Publication Data
US 2021/0049197 A1    Feb. 18, 2021

Related U.S. Application Data

(63) Continuation of application No. 16/550,479, filed on Aug. 26, 2019, which is a continuation of application
(Continued)

(51) Int. Cl.
*G06F 16/35*    (2019.01)
*G06F 16/958*    (2019.01)
(Continued)

(52) U.S. Cl.
CPC ............ *G06F 16/35* (2019.01); *G06F 16/958* (2019.01); *G06F 40/242* (2020.01); *G06F 40/30* (2020.01);
(Continued)

(58) Field of Classification Search
CPC .......... G06F 40/30; G06F 40/20; G06F 40/40; G06F 40/47; G06F 40/49; G06F 3/16;
(Continued)

(56) References Cited

U.S. PATENT DOCUMENTS

| | | | |
|---|---|---|---|
| 6,199,034 B1* | 3/2001 | Wical | G06F 40/30 715/256 |
| 2002/0135618 A1* | 9/2002 | Maes | G06F 3/0481 715/767 |

(Continued)

FOREIGN PATENT DOCUMENTS

| | | |
|---|---|---|
| CN | 101201980 A | 6/2008 |
| CN | 101763352 A | 6/2010 |

(Continued)

OTHER PUBLICATIONS

International Search Report in PCT/CN2015/086751 dated May 11, 2016, 12 pages.
(Continued)

*Primary Examiner* — Yogeshkumar Patel
(74) *Attorney, Agent, or Firm* — Metis IP LLC

(57) ABSTRACT

One aspect of the present disclosure relates to a method of sentiment analysis based on ambiguity analysis, which includes analyzing information with the sentiment analysis models and the ambiguity analysis models. Another aspect of the present disclosure relates to a method of training the sentiment analysis models and ambiguity analysis models, which includes acquiring information, constructing lexicons, conducting sentiment analysis and ambiguity analysis with said lexicons, acquiring corpus, and training models, etc. Meanwhile, another aspect of the present disclosure relates to a system of sentiment analysis, which includes input, and output modules, acquisition modules, processing modules and database.

20 Claims, 20 Drawing Sheets

Related U.S. Application Data

No. 15/752,184, filed as application No. PCT/CN2015/086751 on Aug. 12, 2015, now Pat. No. 10,437,871.

(51) Int. Cl.
*G06K 9/62* (2022.01)
*G06F 40/30* (2020.01)
*G06F 40/242* (2020.01)
*G06V 30/32* (2022.01)

(52) U.S. Cl.
CPC ........... *G06K 9/6201* (2013.01); *G06K 9/627* (2013.01); *G06K 9/6269* (2013.01); *G06V 30/373* (2022.01)

(58) Field of Classification Search
CPC ........ G06F 3/167; G06F 16/35; G06F 16/958; G06F 40/242; G06K 9/6201; G06K 9/6269; G06K 9/627; G06V 30/373; G10L 25/00

See application file for complete search history.

(56) References Cited

U.S. PATENT DOCUMENTS

| | | | | |
|---|---|---|---|---|
| 2003/0233230 | A1* | 12/2003 | Ammicht | G10L 15/183 704/E15.04 |
| 2008/0270116 | A1 | 10/2008 | Godbole et al. | |
| 2012/0278253 | A1* | 11/2012 | Gahlot | G06Q 30/0201 705/347 |
| 2015/0112753 | A1* | 4/2015 | Suvarna | G06Q 30/0201 705/7.29 |
| 2015/0161271 | A1* | 6/2015 | Gur | G06F 16/9537 707/728 |
| 2016/0162582 | A1* | 6/2016 | Chatterjee | G06F 16/248 707/706 |
| 2016/0162790 | A1* | 6/2016 | Gordon | G06F 16/3329 706/11 |
| 2016/0300135 | A1* | 10/2016 | Moudy | G06F 40/20 |

FOREIGN PATENT DOCUMENTS

| | | |
|---|---|---|
| CN | 102999485 A | 3/2013 |
| CN | 103324700 A | 9/2013 |
| CN | 103823859 A | 5/2014 |
| CN | 104331498 A | 2/2015 |

OTHER PUBLICATIONS

Written Opinion in PCT/CN2015/086751 dated May 11, 2016, 10 pages.

* cited by examiner

|  Address bar |
|---|

| whole | Field 1 | Field 2 | Field 3 | Add new fields |
|---|---|---|---|---|

| Search terms | search |
|---|---| result-positive news          More links about positive news

Positive news 1: title and link

Positive news 1: summary

Positive news 2: title and link

Positive news 2: summary

......

result-negative news          More links about negative news

Negative news 1: title and link

Negative news 1: summary

Negative news 2: title and link

Negative news 2: summary

......

result-neutral news          More links about neutral news

Neutral news 1: title and link

Neutral news 1: summary

Neutral news 2: title and link

Neutral news 2: summary

METHOD AND SYSTEM FOR SENTIMENT ANALYSIS OF INFORMATION

CROSS-REFERENCE TO RELATED APPLICATIONS

This application is a continuation application of U.S. patent application Ser. No. 16/550,479, filed on Aug. 26, 2019, which is a continuation application of U.S. patent application Ser. No. 15/752,184 (now U.S. Pat. No. 10,437,871 B2), filed on Feb. 12, 2018, which is a U.S. national stage entry under 35 U.S.C. § 371 of International Application No. PCT/CN2015/086751, filed on Aug. 12, 2015, designating the United States of America, the entire contents of each of which are hereby incorporated by reference.

TECHNICAL FIELD

This invention relates to the field of natural language processing, including information collection, information processing, machine learning, and particularly methods of sentiment analysis based on a language model.

BACKGROUND

With the growing popularity of the Internet, people are increasingly accustomed to using the Internet to obtain information. However, due to the expanding coverage of the Internet and the increasing volume of information, when people try to use the Internet to obtain certain information, the results tend to be promiscuous, and a word may have different meanings in different collocations. Sometimes people want to obtain information related only to a particular meaning of a word, and therefore people want to obtain filtered information obtained by ambiguity analysis with respect to the particular meaning of a word. Besides, sometimes people want to obtain the sentimentally classified information to help them make quick decisions or become informed.

SUMMARY

One aspect of the present disclosure relates to a method for sentiment analysis of information based on ambiguity analysis, including analyzing the ambiguity and sentiment of information using an ambiguity analysis model and a sentiment analysis model. Another aspect of the present disclosure relates to a method of training such an ambiguity analysis model and such a sentiment analysis model, including acquiring information, constructing lexicons, using the lexicons to analyze the ambiguity and sentiment of information, acquiring corpora, training models, etc. Meanwhile, another aspect of the present disclosure relates to a sentiment analysis system, including an input and output module, an acquisition module, a processing module and a database.

In some embodiments, the technical solution disclosed in the present disclosure includes acquiring information, generating a repository, screening out non-ambiguous information of the repository, and analyzing the sentiment of the non-ambiguous information.

In some embodiments, the technical solution disclosed in the present disclosure involves an ambiguity analysis model, according to which an algorithm may be applied to determine whether the acquired information is ambiguous and generate a set of non-ambiguous information. In some embodiments, the technical solution disclosed in the present disclosure may further involve a sentiment analysis model, according to which an algorithm may be applied to perform a sentiment analysis on information. The information may be retrieved from the set of non-ambiguous information or a repository.

In some embodiments, the technical solution disclosed in the present disclosure may further include a method for training an ambiguity analysis model. The method may include acquiring information, scoring the information according to certain rules, generating training corpora of the ambiguity analysis model based on the scores, and training the ambiguity analysis model using the training corpora of the ambiguity analysis model.

In some embodiments, the technical solution disclosed in the present disclosure may further include a method for training a sentiment analysis model. The method may include acquiring information, matching the information using a certain rule, generating training corpus of the sentiment analysis model based on the matching results, training the sentiment analysis model using the training corpora of the sentiment analysis model.

BRIEF DESCRIPTION OF THE DRAWINGS

In order to illustrate the technical solutions related to the embodiments of the present disclosure more clearly, a brief description of the drawings referred to in the description of various embodiments is provided below. Obviously, drawings described below illustrate only some embodiments of the present disclosure. It should be apparent to those having ordinary skill in the art to apply the present disclosure to other similar scenarios according to these drawings. Unless stated or apparent from the context, like reference numerals in the drawings refer to like structure components or operations.

FIG. 20 is a block diagram illustrating a user interface according to some embodiments of the present disclosure.

DETAILED DESCRIPTION

Figure 1:
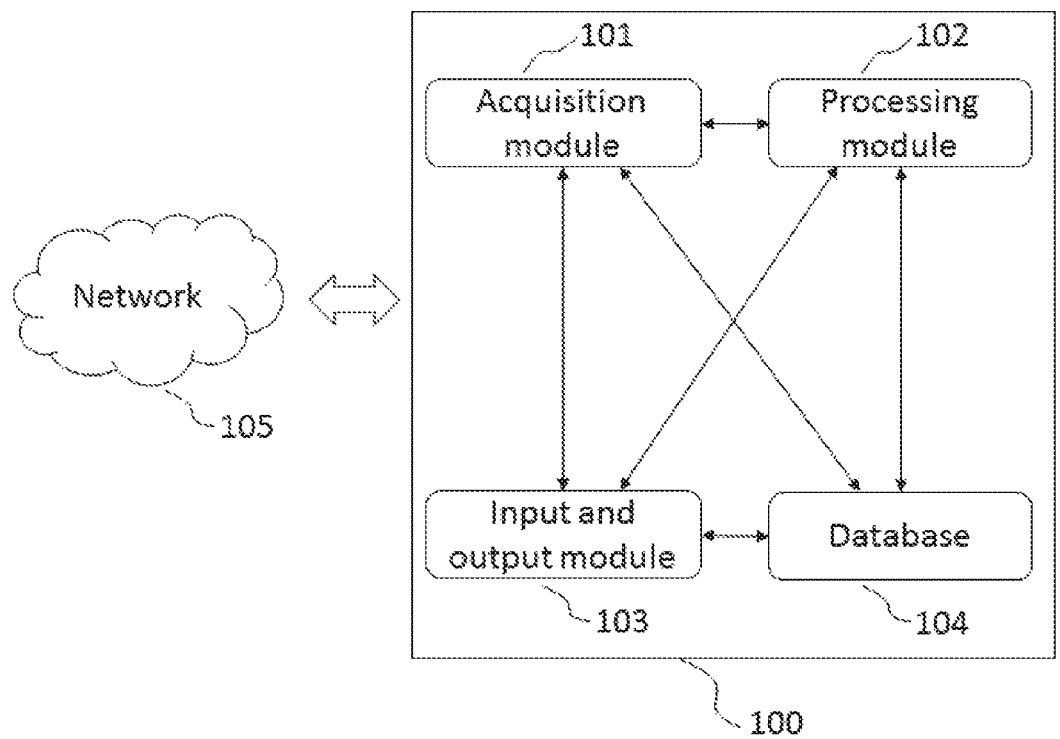
FIG. 1 is a block diagram illustrating a sentiment analysis system.

As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The method and system for processing information of the present disclosure may include acquiring information, constructing lexicons, and using the lexicons to perform ambiguity and sentiment of analyses. In some embodiments, the present disclosure relates to a system for sentiment analysis of information, including an input and output module, an acquisition module, a processing module, and a database.

The various embodiments of the present disclosure may be applied to different fields, including without limitation to financial and derivatives investment (including without limitation to stocks, bonds, gold, paper gold, silver, foreign currency, precious metals, futures, money funds, etc.), technology (including without limitation to mathematics, physics, chemistry and chemical engineering, biology and biological engineering, electrical engineering, communication systems, internet, internet of things, etc.), politics (including without limitation to politicians, political events, countries, etc.), news (in terms of regions, including without limitation to local news, national news, international news; in terms of the subjects of news, including without limitation to political news, technology news, economic news, social news, meteorological news, etc.). The above description of the fields of applications is merely for example, and should not be understood as the only embodiments. Obviously, those skilled in the art, after understanding the basic principles of the method and system for sentiment analysis of information based on ambiguity analysis, may modify the form and details of the method and system for various application fields without departing from the principles. Such modifications and variations are still within the scope of the present disclosure described herein.

The present disclosure may be applied to various types of databases, including without limitation to a hierarchical database, a network database, and a relational database. Obviously, those skilled in the art, after understanding the basic principles of the method and system for sentiment analysis of information based on ambiguity analysis, may modify the form and details of databases used in the method and system without departing from the principles. Such modifications and variations are still within the scope of the present disclosure described herein.

In some embodiments, the technical solution disclosed in the present disclosure may include acquiring information, generating a repository, screening out non-ambiguous information from the repository, and analyzing the sentiment of the non-ambiguous information.

In some embodiments, the technical solution disclosed in the present disclosure includes an ambiguity analysis model, which may apply some algorithms to identify whether the acquired information is ambiguous or non-ambiguous and generate a set of non-ambiguous information. In some embodiments, the technical solution disclosed in the present disclosure may further include a sentiment analysis model, which may analyze the sentiment of information. The information may be retrieved from the set of non-ambiguous information or from the repository.

In some embodiments, the technical solution disclosed in the present disclosure further includes a method of training the ambiguity analysis model, which may include acquiring information, scoring the information using certain rules, generating training corpora of the ambiguity analysis model based on the scoring results, and training the ambiguity analysis model by using the training corpora of the ambiguity analysis model.

In some embodiments, the technical solution disclosed in the present disclosure further includes a method of training the sentiment analysis model, which includes acquiring information, matching the information using a certain rule, generating training corpora of the sentiment analysis model based on the matching results, training the sentiment analysis model by using the training corpora of the sentiment analysis model.

In order to illustrate the technical solutions related to the embodiments of the present disclosure more clearly, a brief description of the drawings used in the embodiments is provided below. Obviously, drawings described below are only some embodiments of the present disclosure. It should be apparent to those having ordinary skill in the art to apply the present disclosure to other similar scenarios according to these drawings. Unless stated or apparent from the context, like reference numerals in the drawings refer to like structure components or operations.

FIG. 1 shows a system that may be used to analyze the sentiment of information. The system may include but not be limited to one or more acquisition modules 101, one or more processing modules 102, one or more input and output modules 103, and one or more databases 104. All or some of the modules may be connected to network 105. The modules may be integrated or distributed, local or remote. In some embodiments, these modules may be independent; and in some embodiments, all or some of the modules may be integrated into one module and work together The acquisition module 101 may be configured to acquire information in various ways. Information may be acquired directly (e.g., directly from network 105) or indirectly (e.g., via acquisition units of other modules). Information may be acquired in a centralized way (e.g., through a particular channel) or a distributed way (e.g., through multiple channels). Information may be acquired locally (e.g. from local modules or units with storage capacity) or remotely (e.g., crawling by a search engine). Information may be acquired via a wired connection (e.g., via a cable or a fiber optic cable, etc.) or a wireless connection (e.g., via radio or optical signals, etc.). Information may be acquired manually or automatically. Information may be acquired based on an existing algorithm or the algorithm defined by a user. Information may be acquired as described above, or by a combination of any of the ways described above. The information may be retrieved from network 105 (e.g., a metropolitan area network, a wide area network, a local area network, etc.), news, newspapers, media, and may also be from the processing module 102 (one or more), the input and output module 103 (one or more), the database 104 (one or more), or the like, or a combination thereof. For example, the acquisition module 101 may retrieve needed information from all or part of the results generated by the processing module 102; the acquisition module 101 may retrieve needed information from the words, phrases, sentences, images, audio files, and video files inputted or uploaded by a user; the acquisition module 101 may also retrieve information from the database 104. The acquisition module 101 may transmit all or some of the acquired information to the processing module 102, the database 104, the input and output module 103, or the like, or a combination thereof. The information may include but not be limited to terminologies of a field, words strongly related to the terminologies, information containing the terminologies and words with sentiment, or the like, or a combination thereof. The fields may include but not be limited to sports, entertainment, economy, politics, culture, or the like, or a combination thereof. Such terminologies of a field may include but not be limited to terms of art, full names, acronyms, codes, synonyms, abbreviations of a particular field, or the like, or the combination thereof. The words strongly related to terminologies may include but not be limited to nouns, verbs, adjectives, phrases, collocations, synonyms, antonyms, derivatives, compound words, or the like, or a combination thereof. The information containing the terminologies may include but not be limited to dictionaries, news, research reports regarding to a company, announcements, product manuals, webpages of relevant websites, or the like, or a combination thereof. The format of the information may include but not be limited to text, image, audio, video, or the like, or a combination thereof. The language used in the information may include but not be limited to Chinese, English, Japanese, Korean, French, German, or the like, or a combination thereof. The above description of the information is merely exemplary embodiments, and should not be understood as the only embodiments. Obviously, those skilled in the art, after understanding the basic principles of the information, may use different contents of information without departing from the principles. Such modifications and variations are still within the scope of the present disclosure described herein.

The processing module 102 may exchange information via network 105. The processing module 102 may exchange information with the acquisition module 101. The processing module 102 may exchange information with the database 104. The processing module 102 may exchange information with the input and output module 103. The processing module 102 may acquire information from network 105 directly, and may receive the information from the acquisition module 101. The information may include but not be limited to terminologies of a field, words strongly related to the terminologies, information containing the terminologies and words with sentiment, or the like, or a combination thereof. The processing module 102 may transmit information to network 105. The information may include but not be limited to the information processed by the processing module 102, the information unprocessed by the processing module 102, etc. The information processed by the processing module 102 may include but not be limited to the information classified according to a particular classification rule. After processing information, the processing module 102 may provide the processed information to the database 104 for storage using a particular storage mechanism. Similarly, the processing module 102 may also store the unprocessed information from the acquisition module 101 or the network 105 to the database 104. The storage mechanism may include but not be limited to sequential storage, linked storage, indexed storage, hashing storage, or the like, or a combination thereof. The unprocessed information may include but not be limited to unclassified words, phrases, sentences, paragraphs, or the like, or a combination thereof. The processed information may include but not be limited to classified words, phrases, sentences, paragraphs, or the like, or a combination thereof. The processing module 102 may also transmit information to the input and output module 103. The information may include but not be limited to processed information, as well as unprocessed information. The processing module 102 may also receive the data or instructions from the input and output module 103, and analyze the received data or instructions and take actions accordingly.

The input and output module 103 may be configured to exchange information between the system and a peripheral device, and to receive external information. The input and output module 103 may be connected to a peripheral device via the network 105, or directly. The input and output module 103 may receive user input information. The user input information may be retrieved from network 105, a peripheral device, or a third party communicating with the system. The input and output module 103 may transmit the output generated to a peripheral device and the results may be displayed to a user. The peripheral devices may include but not be limited to a mouse, a keyboard, a touchpad, a trackball, a voice recognition device, an image recognition device, a display device, a mobile phone, a PC, a Macintosh, a tablet computer, or the like, or a combination thereof. The user input may be in the format including but not limited to numbers, characters, symbols, text, sound, graphics, images, video, or the like, or a combination thereof. The output method may include but not be limited to output the information classified according to a particular classification rule. The input and output module 103 may transmit or exchange information with the acquisition module 101. The input and output module 103 may receive information from the acquisition module 101. The input and output module 103 may transmit the received user input information via a peripheral device to the acquisition module 101. The input and output module 103 may output the information obtained by the acquisition module 101, and the information may be presented to a user through a peripheral device. The input and output module 103 may transmit or exchange information with the processing module 102. The input and output module 103 may transmit received information to the processing module 102 for processing. The input and output module 103 may output the information received from the processing module 102, and the information may be presented to a user through a peripheral device. The input and output module 103 may transmit or exchange information with the database 104. The input and output module 103 may output the information received from the database 104, and the information may be presented to a user through a peripheral device. The input and output module 103 may transmit the received information to the database 104.

The database 104 or other storage devices in the system may be configured to store information. The database 104 or other storage devices may digitalize information and then store the digitalized information in an electric, magnetic, or optical storage device, etc. The database 104 or other storage devices in the system may be configured to store all kinds of information such as programs and data. The database 104 or other storage devices in the system may include a device that stores information electrically, such as a variety of memories including a random access memory (RAM), a read only memory (ROM), or the like. The database 104 or other storage devices in the system may include a magnetic storage device, such as a hard disk, a floppy disk, a magnetic tape, a magnetic core memory, a bubble memory, a universal serial bus (USB) flash drive, etc. The database 104 or other storage devices in the system may include an optical device, e.g., a compact disk (CD), a video compact disk (VCD). The database 104 or other storage devices in the system may include a magneto-optical storage device, e.g. a magneto-optical (MO) disk. The database 104 or other storage devices in the system may store information randomly, serially, read-only, etc. The database 104 or other storage devices in the system may be a non-permanent or permanent memory. The database 104 or other storage devices in the system may be local, remote, or on a cloud server. The database 104 or other storage devices in the system may classify, sort, or filter internal information. The database 104 or other storage devices in the system may exchange information with the acquisition module 101. The database 104 or other storage devices in the system may receive information acquired by the acquisition module 101 and store it. The information stored in the database 104 or other storage devices in the system may be retrieved and transmitted to the acquisition module 101 according to an instruction. The instructions may be transmitted directly from the acquisition module 101, or other modules, e.g. the input and output module 103, the processing module 102. The information may be from the database 104 or other storage devices in the system. For example, the database 104 or other storage devices in the system may transmit information to the acquisition module 101 at a specific time according to a particular instruction. The database 104 or other storage devices in the system may transfer or exchange information with the processing module 102, and may receive and store information from the processing module 102. The information stored in the database 104 or other storage devices in the system may be retrieved and transmitted to the processing module 102 according to an instruction. The instructions may be transmitted directly from the processing module 102, or another module, e.g. the input and output module 103, the acquisition module 101. The information may be from the database 104 or other storage devices in the system. For example, the database 104 or other storage devices in the system may transmit information to the processing module 102 at a specific time according to a particular instruction. The database 104 or other storage devices in the system may transmit or exchange information with the input and output module 103, and may receive and store information from the input and output module 103. The information stored in the database 104 or other storage devices in the system may be retrieved and transmitted to the input and output module 103 according to an instruction. The instructions may be transmitted directly from the input and output module 103, or other modules, e.g. the acquisition module 101, the processing module 102. The information may be from the database 104 or other storage devices in the system. For example, the database 104 or other storage devices within the system may transmit information to the input and output module 103 at a specific time according to a particular instruction.

The connection between different modules in the system, the connection between modules and peripheral devices, and the connection between the system and a cloud server may be wired or wireless. A wired connection may include but not be limited to a metal cable, an optical cable, and a hybrid cable, for example, a coaxial cable, a communication cable, a flexible cable, a spiral cable, a non-metallic sheath cable, a metallic sheath cable, a multi-core cable, a twisted pair cable, a ribbon cable, a shielded cable, a telecommunications cable, a paired cable, a twin-lead cable, and a twisted pair. The above mentioned examples are only illustrative, and the media of a wired connection may be of another type, such as other electrical or optical transmission media. A wireless connection may include but not be limited to radio communications, free-space optical communications, acoustic communications, electromagnetic induction communications, or the like, or a combination thereof. The radio communications may include but not be limited to an IEEE 802.11 series standard, an IEEE 802.15 series standard (such as BLUETOOTH and ZIGBEE technology, etc.), a first generation mobile communication technology, a second generation mobile communication technology (such as, frequency division multiple access (FDMA), time division multiple access (TDMA), Space Division Multiple Access (SDMA), code division multiple access (CDMA), and spread spectrum multiple access (SSMA), etc.), a general packet radio service (GPRS), a third generation mobile communication technology (such as, CDMA2000, wideband code division multiple access (WCDMA), time division synchronous CDMA (TS-SDMA), and worldwide interoperability for microwave access (WiMax), etc.), a fourth generation mobile communication technology (such as, time-division duplex long-term evolution (TD-LTE) and frequency-division duplex long-term evolution (FDD-LTE), etc.), satellite communication (such as, global positioning system (GPS) technology, etc.), and other technology that operates on industrial scientific medical (ISM) frequencies (such as 2.4 GHz, etc.). The free-space optical communications may include but not be limited to visible lights, infrared signals, or the like, or a combination thereof. The acoustic communications may include but not be limited to sonic signals and ultrasonic signals. The electromagnetic induction communications may include but not be limited to a near field communication technology, etc. The above mentioned examples are only illustrative, and wireless connections may also be of other types, such as a Z-wave technology, a Bluetooth low energy (BLE) technology, the 433 MHz communication protocol, other charged civil radio frequencies and military radio frequencies, etc.

The connection mechanisms between different modules in the system, between a module and a peripheral device, and between the system and a storage device or a cloud server are not limited to the above mentioned examples. The above mentioned connection mechanisms in the system may be used alone or in a combination. In the case where multiple connection mechanisms are combined, gateways may be used to facilitate the information exchange. Different modules may be integrated to one device or electronic component to achieve the function of more than one modules. A peripheral device may also be integrated into one device or electronic component containing one or more modules, and one or more modules may be integrated on one or more peripheral devices or electronic components. In addition, the data transmission between different modules may be performed directly or indirectly, via a wired connection or wirelessly, in serial or simultaneously, periodically or non-periodically. The above description of data transmission mechanisms between different modules is merely provided as exemplary embodiments, and should not be understood as the only embodiments. Obviously, those skilled in the art, after understanding the basic principles of the data transmission mechanisms between different modules, may modify the contents of the information without departing from the principles. Such modifications and variations are still within the scope of the present disclosure described herein.

Figure 2:
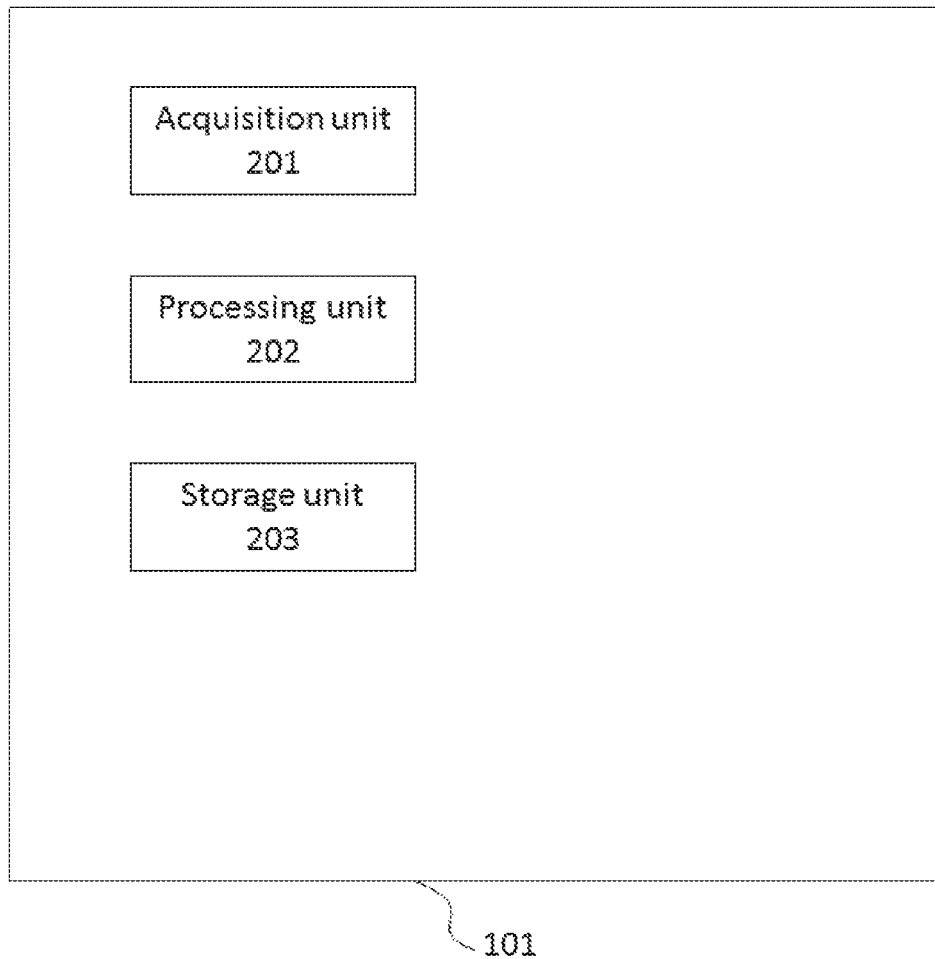
FIG. 2 is a block diagram illustrating an acquisition module according to some embodiments of the present disclosure.

FIG. 2 block diagram illustrating an acquisition module 101 according to some embodiments of the present disclosure. The acquisition module 101 may include but not be limited to one or more acquisition units 201, one or more processing units 202, and one or more storage units 203. The units may be integrated or distributed, local or remote. In some embodiments, these units may be independent; and in some embodiments, all or some of the units may be integrated into one unit to work together.

The acquisition module 101 may acquire information through the acquisition unit 201. All or some of the acquired information may be stored in the storage unit 203 or the database 104, and may be transmitted to the processing unit 202 for processing. Processing results may be stored in the storage unit 203. The process may include but not be limited to retrieving some keywords, assessing the value of the information (e.g., assessing the relevance between the acquired information and the information needed by a user), or the like. The information processed by the processing unit 202 may be retrieved from the acquisition unit 201, the storage unit 203, other modules or other storage devices in the system (e.g., the database 104). The information stored in the storage unit 203 may be further stored in the database 104. The information may be transmitted to the processing unit 102 for processing, or to the input and output module 103 for outputting. Data transmission between different modules may be performed directly or indirectly, via a wired connection or wirelessly, in serial or simultaneously, periodically or non-periodically.

Figure 3:
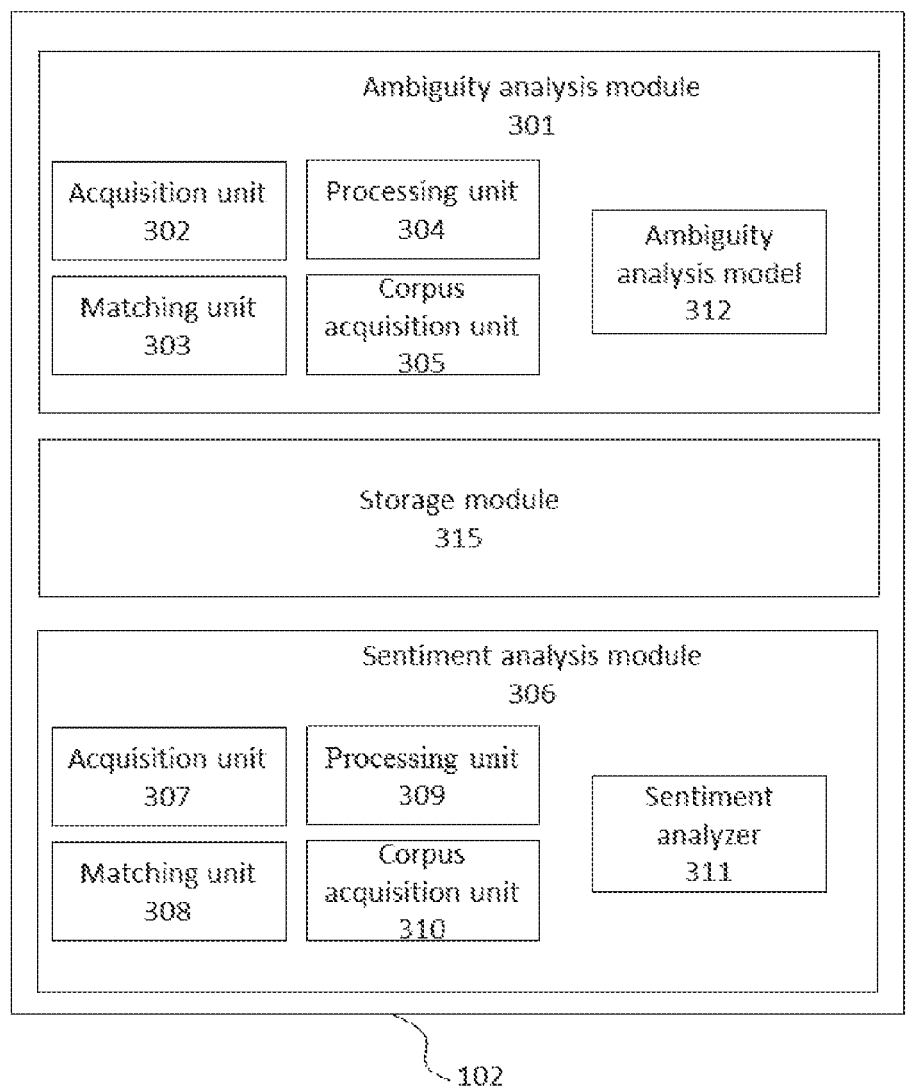
FIG. 3 is a block diagram illustrating a processing module according to some embodiments of the present disclosure.

FIG. 3 shows a block diagram illustrating a processing module 102. The processing module 102 may include but not be limited to one or more ambiguity analysis modules 301, one or more sentiment analysis modules 306, and one or more storage modules 315. In some embodiments, these modules are independent; and in some embodiments, all or some of the modules may be integrated into one module to work together.

The ambiguity analysis module 301 may be configured to acquire information, process the information and generate an ambiguous corpus or a non-ambiguous corpus for training the ambiguity analysis model 312. The ambiguity analysis module 301 may include but not be limited to one or more acquisition units 302, one or more matching units 303, one or more processing units 304, one or more corpus acquisition units 305, and one or more ambiguity analysis models 312. The acquisition unit 302 of the ambiguity analysis module 301 may be configured to retrieve information using various mechanisms, and it may retrieve information directly from network 105. Information may be retrieved in centralized manner or in a distributed manner, locally or remotely, via a wired connection or wirelessly, manually or automatically, or a combination thereof. It should be noted that the above description of the fields of application provides merely exemplary embodiments, and should not be understood as the only embodiments. Obviously, those skilled in the art, after understanding the basic principles of acquiring information, may modify the form and details of information acquisition without departing from the principles. Such modifications and variations are still within the scope of the present disclosure described herein.

The acquisition unit 302 of the processing module 102 may be configured to acquire information. The information may include but not be limited to a keyword dictionary 502, an ambiguity list 504, a correlative dictionary 503 (FIG. 5), and contents in a repository 511, etc. The matching unit 303 of the ambiguity analysis module 301 may match the information in the repository 511 according to the acquired information. The processing module 102 may send requests to the database 104 for accessing keywords and dictionaries. In response to such requests, the database 104 may send the keyword dictionary 502, the correlative dictionary 503, and an ambiguity list to the processing module 102. The matching unit 303 of the processing module 102 may match keywords based on a particular algorithm. The particular algorithm may include but not be limited to a prefix search algorithm, a suffix search algorithm, a substring search algorithm, or the like, or a combination thereof. The processing unit 304 may score the matching result to assess an ambiguity level of the information, and the score may be used as a preliminary standard to determine whether a sentence is ambiguous or non-ambiguous during a subsequent ambiguity analysis. The factors involved in the scoring may include but not be limited to the length of a terminology, the length of a correlative, the length of information, a weight of the terminology in the information, a weight of the correlative in the information, the number of correlatives, the number of terminologies, or the like, or a combination thereof. The above description of the matching unit 303 and the processing unit 304 provides merely exemplary embodiments, and should not be understood as the only embodiments. The corpus acquisition unit 305 may be configured to retrieve an element set. The element set may include a keyword, a word used with the keyword, a relative position, an ambiguous or non-ambiguous sentence. The element set may be stored in the corpus acquisition unit 305. In some embodiments, the element set be used to train the ambiguity analysis model 312. Obviously, those skilled in the art, after understanding the basic principles of matching unit and processing unit, may modify the contents of information without departing from the principles. Such modifications and variations are still within the scope of the present disclosure described herein.

The scoring result may be used to assess an ambiguity level of information. In some embodiments, several thresholds may be set with respect to the score to preliminarily classify the information into a strongly ambiguous sentence and an obviously non-ambiguous sentence. In some embodiments, when the ambiguity of some words or information cannot be determined based on the score, these words or information may need further verification. Verification may be performed by an operator, automatically based on a model, or a combination thereof. Factors involved in the scoring may include but not be limited to the length of a term of art, the length of a correlative, the length of the information, a weight of the term of art in the information, a weight of the correlative in the information, the number of correlatives, the number of terms of arts, or the like, or a combination thereof. After all the operations, a classification result related to whether the information is ambiguous or non-ambiguous may be obtained.

In some embodiments, the information classification result may be used to train a model used in the verification. The model may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, etc. The above description of the ambiguity analysis module 301 provides merely exemplary embodiments, and should not be understood as the only embodiments. Obviously, those skilled in the art, after understanding the basic principles of ambiguity analysis, may modify the contents of information without departing from the principles. Such modifications and variations are still within the scope of the present disclosure described herein.

The ambiguity analysis module 301 may include but not be limited to one or more ambiguity analysis models 312. After trained for a period of time, the ambiguity analysis model 312 may be used to determine whether the description of a terminology in a piece of news is ambiguous. Afterwards, the system may output a set of non-ambiguous sentences. The set of non-ambiguous sentences may be stored in a location including without limitation to the storage module 315, the database 104, or other storage devices in the system, or a combination thereof. The set of non-ambiguous sentences may be transmitted to other modules (e.g., the sentiment analysis module 306) for processing. The ambiguity analysis model 312 may perform an ambiguity analysis with the assistance by an operator or automatically.

The sentiment analysis module 306 may include but not be limited to one or more acquisition units 307, one or more matching units 308, one or more processing units 309, one or more corpus acquisition units 310, and one or more sentiment analyzers 311. The units may be centralized or distributed, local or remote. In some embodiments, these units are independent; and in some embodiments, all or some of the units may be integrated into one unit to work together. The sentiment analysis module 306 may analyze a sentiment type of the non-ambiguous information generated by the ambiguity analysis module 301. The sentiment type may include but not be limited to positive, negative, and neutral. In some embodiments, the acquisition module 101 may acquire information to construct one or more sentimental collocation libraries 507 (FIG. 5) which include sentimental collocations. A sentimental collocation library 507 may be stored in the database 104. The acquisition unit 307 of the sentiment analysis module 306 may be configured to acquire information. The acquired information may include but not be limited to contents of the sentimental collocation library 507 and the repository 511 of the database 104. The matching unit 308 of the sentiment analysis module 306 may match information acquired by the acquisition unit 307 to non-ambiguous information generated by the ambiguity analysis module 301 by a mechanism including without limitation to a regular expression operation, etc. The processing unit 309 may measure a matching accuracy, and mark the collocation with an accuracy exceeding a certain threshold as a strong sentimental collocation (e.g., "increase sharply" may be determined as a strong sentimental collocation). The processing unit 309 may score a sentence without a strong sentimental collocation, and determine a corresponding sentimental type of the sentence according to its score. A strong sentimental collocation may be stored in the corpus acquisition unit 310. The corpus acquisition unit 310 may be configured to acquire a collocation with a sentimental type, a collocation without a sentimental type, and a sentimental sentence.

There are mainly two kinds of sentiment analysis methods, dictionary based and machine-learning based. In a dictionary based sentiment analysis, a dictionary including words labeled with sentiment types may be predefined. The sentimental type of a sentence or an article may be determined based on a particular algorithm according to some preset factors including the number and the weights of negative or positive sentimental words. A machine-learning based sentiment analysis may be treated as a problem of a text classification, and so the methods used in the text classification (including without limitation to a decision tree, a Rocchio algorithm, a Naïve Bayes algorithm, a neural network model, a support vector machine algorithm, a linear least squares fit model, a K-nearest algorithm, a genetic algorithm, a maximum entropy model, etc.) may be used in a sentiment analysis. A classifier used to classify new text may be obtained by training with texts labeled with sentiment types. In some embodiments, a combination of dictionary based sentiment analysis and machine-learning based sentiment analysis may be used to analyze the sentiment of a sentence or an article.

The sentiment analysis module 306 may include but not be limited to one or more sentiment analyzers 311. After training for a period of time, the sentiment analyzer 311 may be used to determine the sentiment type of non-ambiguous sentences in a piece of news. Afterwards, a set of classified sentences may be outputted. The set of classified sentences may be stored in a location including but not limited to the storage module 315, the database 104, and other storage devices in the system, or a combination thereof. The sentiment analyzer 311 may perform a sentiment analysis aided by an operator or automatically.

Figure 4:
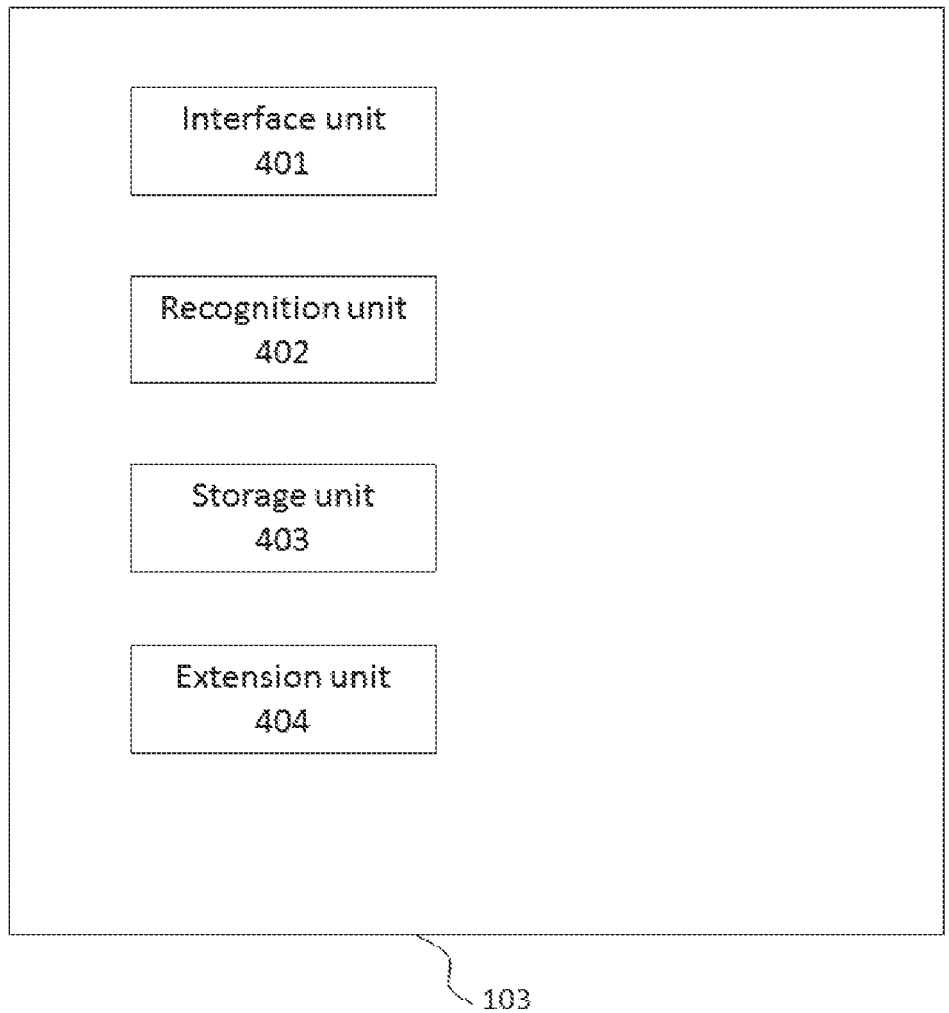
FIG. 4 is a block diagram illustrating an input and output module according to some embodiments of the present disclosure.

FIG. 4 shows a block diagram illustrating an input and output module 103. The input and output module 103 may include but not be limited to one or more interface units 401, one or more recognition units 402, one or more storage units 403, and one or more extension units 404. The units may be centralized or distributed, local or remote. In some embodiments, these units are independent; and in some embodiments, all or some of the units may be integrated into one unit to work together.

The interface unit 401 of the input and output module 103 may be configured to receive input information and output a result generated by the system. The information may be transmitted to the processing module 102 for processing, and the processing may include but not be limited to analyzing ambiguity or sentiment. The information may be stored in a location including the storage unit 403, the database 104 or other storage devices in the system, or the like, or a combination thereof. The results may be the information classified based on particular rules, including positive information, negative information, or neutral information, and the results may be presented to a user via a peripheral device.

The recognition unit 402 may be configured to recognize a sentiment label of the analyzed information, and then instruct the interface unit 401 to display the classified information according to the sentiment label.

The storage unit 403 may be configured to store the information retrieved from the interface unit 401, the recognition unit 402, or another module, such as the acquisition module 101, the processing module 102, the database 104, or the like, or a combination thereof.

The extension unit 404 of the input and output module 103 may be configured to provide, based on a need of a user, an extension to allow the system to expand its functions. The expanded functions may include but not be limited to subscription, information sharing, intellectual learning, updating, or the like, or a combination thereof. The extension unit 404 may store preferences defined by a user in the user database 513 of the database 104 (FIG. 5), and the preferences defined by a user may include but not be limited to the keywords input by the user, a frequency and method of pushing information, an object with whom information is shared, the content of the shared information, and an update frequency by the system.

According to some embodiments of the present disclosure, the extension unit 404 of the input and output unit 103 may be configured to provide a subscription function. A user may subscribe information containing particular keywords. The extension unit 404 may push the information after the sentiment analysis to a user by various means based on the user's subscription. The extension unit 404 may push information to a user, and provide other functions including without limitation to recommending the user follow other users sharing similar interest, recommending comments of information to the user, and providing the user with a usefulness score of information. The extension unit 404 may push information by way of or via a mobile application, e-mail, short messaging service (SMS), a really simple syndication (RSS) portal, an online single user aggregator, a search engine, a browser, an instant messaging software, social media, etc. The frequency of pushing information by the extension unit 404 may be set by the system or defined by a user, and may be regular or not, real-time or delayed. The regular frequency of pushing information may include, without limitation to, a few hours, days, weeks, months, quarters, years, or the like, or a combination thereof. The irregular frequency of pushing information may include but not be limited to on workdays or holidays of different countries, in the morning, at noon, in the evening, or the like, or a combination thereof. The format of the pushed information may include but not be limited to text, voices, images, animation, videos, or the like, or a combination thereof. The pushed information of the extension unit 404 may include but not be limited to an update of the information that a user has browsed, the information that a user follows, the information that the system recommends based on user records, or the popularity of similar information. The above description of the extension unit 404 provides merely exemplary embodiments, and should not be understood as the only embodiments. Obviously, those skilled in the art, after understanding the basic principles of the extension unit 404, may modify the form and details of the particular mechanisms and operations of implementing the extension unit 404 and its functions without departing from the principles. Such modifications and variations are still within the scope of the present disclosure described herein.

Based on some embodiments of the present disclosure, the extension unit 404 of the input and output module 103 of the system may be configured to provide a function of intellectual learning. The extension unit 404 may learn, analyze, and memorize a user's habit intelligently, including without limitation to a frequently followed area, frequently searched keywords, or preferred sentimental types. For example, in some embodiments, the extension unit 404 may memorize a subsidiary of a transnational corporation automatically or based on a user label, and after the user enters the name of the company, the extension unit 404 may display information of the subsidiary first. In some embodiments, the extension unit 404 may learn the information in different sentimental types or different areas that a user follows at different times, and push the information at particular times. The above description of the extension unit 404 and its functions is merely provided as exemplary embodiments, and should not be understood as the only embodiments. Obviously, those skilled in the art, after understanding the basic principles of the extension unit 404 and its functions, may modify the form and details of the particular methods and operations of implementing the extension unit 404 and its functions without departing from the principles. Such modifications and variations are still within the scope of the present disclosure described herein.

Based on some embodiments of the present disclosure, the extension unit 404 of the input and output module 103 of the system may be configured to provide the function of sharing information. Information sharing may be that a user shares information with a friend in various ways. Information sharing is a way of distributing information by a user. The information may be distributed to a desired destination, and the access to the information may be limited to a desired group of people. The shared information may be a single message or multiple messages. The shared information may be part of the contents selected or the entire contents on a page. The shared information may include the contents of information or the comments of the information. The shared information may include the popularity of the information or the usefulness score of the information. Information may be shared via a channel including but not limited to SMS, multimedia messaging service (MMS), e-mail, QQ, MSN, WeChat, microblog, Douban, twitter, Facebook, Instagram, Renren, instant messaging software, or the like, or a combination thereof. The objects who receive the shared information may include but not be limited to a single friend, a number of friends, a circle of friends, a public circle, a forum, another user, or the like, or a combination thereof. The format of the shared information may include but not be limited to text, images, voices, animation, videos, web links, or the like, or a combination thereof. The above description of information sharing and its functions provides merely exemplary embodiments, and should not be understood as the only embodiments. Obviously, those skilled in the art, after understanding the basic principles of information sharing and its functions, may modify the form and details of the particular methods and operations of implementing information sharing and its functions without departing from the principles. Such modifications and variations are still within the scope of the present disclosure described herein.

Figure 5:
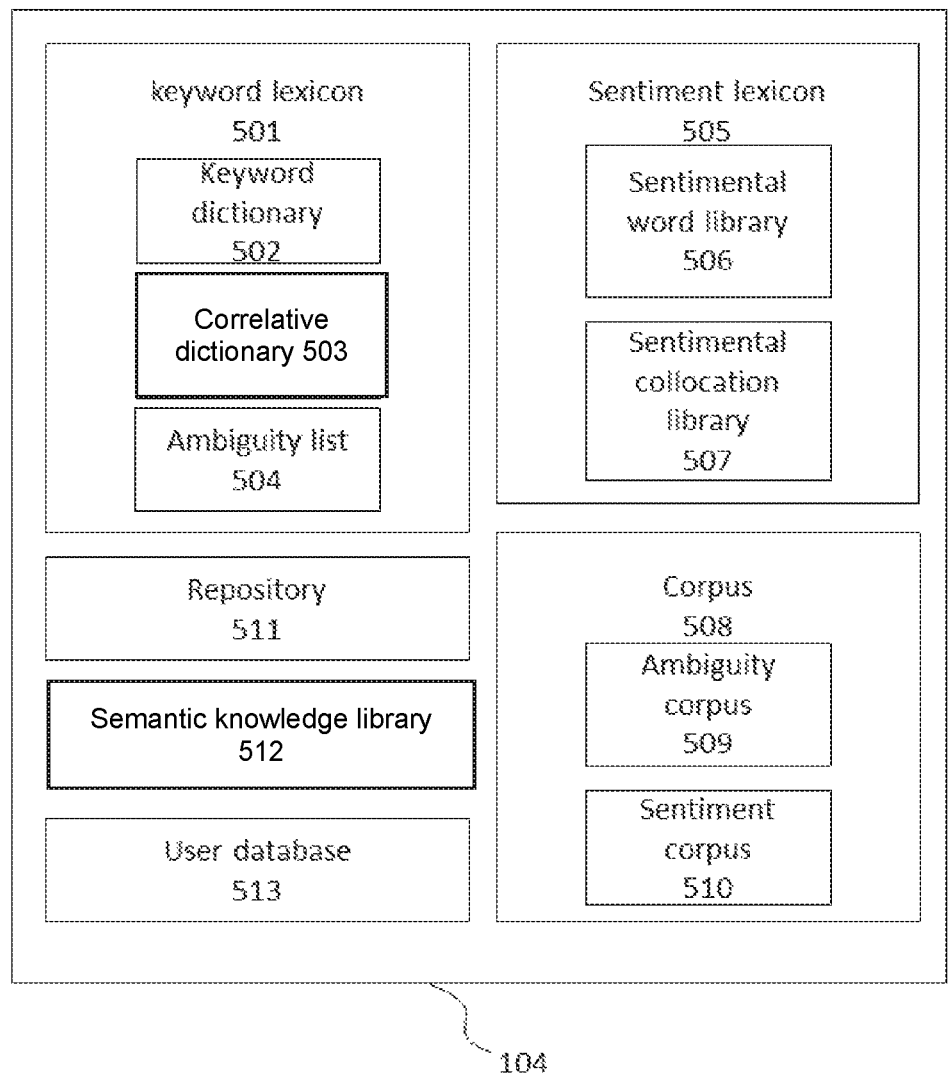
FIG. 5 is a block diagram illustrating a database according to some embodiments of the present disclosure.

FIG. 5 shows units that the database 104 may contain or use. The database 104 may include but not be limited to one or more keyword lexicons 501, one or more sentiment lexicons 505, one or more repositories 511, one or more corpora 508, one or more semantic knowledge libraries 512, and one or more user databases 513. The keyword lexicon 501 may include but not be limited to one or more keyword dictionaries 502, one or more correlative dictionaries 503, and one or more ambiguity lists 504. The above description of a dictionary is for the purpose of illustration, but not intended to be limiting. The keyword dictionary 502 may be configured to store terminologies. The terminologies may include but not be limited to terms of art in a particular field, full names, acronyms, codes, synonyms, or abbreviations in a particular field, or the like, or the combination thereof. The terminologies in the keyword dictionary 502 may be retrieved from the acquisition module 101 or the processing module 102. The correlative dictionary 503 may be configured to store correlatives, including without limitation to, correlatives of terminologies. The correlatives may include but not be limited to terms of art, nouns, verbs, adjectives, phrases, short sentences, terms, synonyms, antonyms, common collocations, derivatives, and compound words, or the like, or a combination thereof. The ambiguity list 504 may be configured to store the terms of art that are ambiguous verified by an operator, or based on a model, or a combination thereof. The sentiment lexicon 505 may include but not be limited to one or more sentimental word libraries 506 and one or more sentimental collocation libraries 507. The sentimental word library 506 may be configured to store sentimental words. A sentimental word may be a word that contains some sentimental information. Merely by way of examples, fine, excellent, raise, good, increase, gain, rise, compensatory growth, earning, limit up, soaring profits, reduce, decrease, sharply decline, delayed fall, go down, loss, pay for, lose, limit down, reduce holdings, decline, or the like. The sentimental words may include but not be limited to nouns, verbs, and adjectives with sentiment. The information stored in the sentimental word library 506 may be from a source including but not limited to an open source dictionary on the internet, or a specialized dictionary, or the like. The sentimental collocation library 507 may be configured to store sentimental collocations. The sentimental collocations may include but not be limited to the collocations that match with the sentimental words in the sentimental word library 506, short sentences, synonyms, antonyms, common collocations, derivatives, compound words, or the like. The information stored in the sentimental collocation library 507 may be retrieved from an open source dictionary on the internet, a specialized dictionary, news, a research report, an announcement, a product manual of a relevant company, other relevant sites, or the like.

The sentimental collocation library 507 may be fixed, or updated and expanded. The sentimental collocation library 507 may be expanded based on an algorithm including but not limited to a pointwise mutual information (PMI) algorithm. The corpus 508 may include but not be limited to one or more ambiguity corpuses 509, one or more sentiment corpuses 510. The ambiguity corpus 509 may be configured to store an ambiguity corpus. An ambiguity corpus may include but not be limited to words, collocations, and sentences that have been marked as ambiguous or non-ambiguous. The sentiment corpus 510 may be configured to store a sentiment corpus. The sentiment corpus may include but not be limited to words, collocations, and sentences that have been marked with their respective sentiment types.

The corpus in the ambiguity corpus 509 may be retrieved from the corpus acquisition unit 305 of the ambiguity analysis module 301. The corpus in the sentiment corpus 510 may be retrieved from the corpus acquisition unit 310 of the sentiment analysis module 306. The information stored in the ambiguity corpus 509 and the sentiment corpus 510 may be retrieved from an open source dictionary on the internet, or a specialized dictionary, news, a research report, an announcement, a product manual of a relevant company, other relevant sites, or the like.

The repository 511 may be configured to store the information containing keywords. The information stored in the repository 511 may or may not be processed by ambiguity or sentiment analysis. The information may be retrieved from the acquisition module 101.

The semantic knowledge library 512 may be configured to store concept based words, phrases, sentences, and paragraphs. Based on the semantic knowledge library 512, the sentiment types of words, phrases, sentences, or paragraphs may be identified. The semantic knowledge library 512 may, in particular, identify words, phrases, sentences and paragraphs without sentiment words.

The user database 513 may be configured to store the information related to a user. The information related to the user may include but not be limited to the user's personal information, a search history, user defined settings, etc. The user's personal information may include but not be limited to a user name, a password, a login frequency, and a login time, etc. Information regarding the search history of a user may include but not be limited to searched keywords, and the results obtained based on the searched keywords. Information regarding the user defined settings may include but not be limited to the setting of subscription, information sharing, intellectual learning, system updating, or the like, or a combination thereof. The setting of subscription may include but not be limited to a keyword of the information that the user subscribes, the frequency, format, or destination for pushing information set by the user, or the like, or a combination thereof. The setting of information sharing may include but not be limited to the objects, format, or frequency of sharing information. The setting of intellectual learning may include but not be limited to a frequency of intellectual learning. The setting of system updating may include but not be limited to a frequency of updating.

The above description of the database provides merely exemplary embodiments, and should not be understood as the only embodiments. Obviously, those skilled in the art, after understanding the basic principles of the database, may modify the form and details of the database without departing from the principles. Such modifications and variations are still within the scope of the present disclosure described herein.

In some embodiments of the present disclosure, the system may include a user interface. The user interface may receive user input directly or through a peripheral device, and may show one or multiple sentiment types of information to a user. The user input received via the user interface may be stored in the storage unit 403, and then transmitted to another module, such as the acquisition module 101, the processing module 102, or the database 104. The user input may be transmitted to another module directly. The information output from the user interface may be retrieved from the storage unit 403. The information output via the user interface may come directly from the recognition unit 402, or another module, such as the acquisition module 101, the processing module 102, or the database 104. The user interface may be a graphical user interface, a direct manipulation interface, a web-based user interfaces (WUI), a touch-screen, a command line interface, a touch user interface, a hardware interface, an attentive user interface, a batch interface, a conversational interface agent, a crossing-based interface, a gesture interface, an intelligent user interface, a motion tracking interface, a multi-screen interface, a non-command user interface, an object-oriented user interface, a reflexive user interface, a search interface, a task-focused interface, a text-based user interface, a voice user interface, a natural-language interface, a zero-input interface, a zooming user interface, and so on. The user interface may display information in categories and different sentiment types of information may be displayed on the same page or on different pages. The forms of the displayed information may include but not be limited to text, images, audios, videos, animation, broadcast, etc. In different forms, the sentences with sentiment types may be displayed in one or more highlight forms. For example, the text information may be highlighted with one or more colors different from the color of the main body of the information. The colors may include but not be limited to red, blue, yellow, pink, orange, green, and purple, etc. The text information may be emphasized with one or more fonts different from the font of the main body of the information. The fonts may include but not be limited to song typeface, imitated song front, regular script, italic, boldface, Times New Roman, Calibri, etc. The text information may be emphasized with one or more font sizes different from the font size of the main body of the information. The font sizes may include but not be limited to size two, size three, size four, size small four, size five, size small five, etc. A sentence with a sentiment type may be underlined. The underline may be in the form including but not limited to a straight line, a dashed line, etc. The image information may be emphasized using a frame with one or more shapes, which may include but not be limited to a circle, a square, a rectangular, a diamond, an ellipse, or the like. The image information may be emphasized with a frame with one or more colors. The colors of the frame may include but not be limited to red, blue, yellow, pink, orange, green, and purple, etc. The audio or broadcast information may be emphasized using one or more volume levels.

The user interface may display information after it is subject to sentiment analysis in one or more fields to a user. The fields may include but not be limited to finance and derivatives investments (including without limitation to stocks, bonds, gold, paper gold, silver, foreign exchange, precious metals, futures, money fund, etc.), technology (including without limitation to mathematics, physics, chemistry and chemical engineering, biology and biological engineering, electrical engineering, communication systems, internet, internet of things, etc.), politics (including without limitation to politicians, political events, countries, etc.), news (in terms of regions, including without limitation to local news, national news, international news; in terms of subjects of news, including without limitation to political news, technology news, economic news, lifestyle news, weather news, etc.). In addition, a user may add a field of interest on the interface as a shortcut, and then view the information in one or more fields conveniently after a sentiment analysis of the information. The user interface may provide a user with favorites, and the user may collect one or more kinds of information in the favorites for convenient review in the future. The information may be collected in the form of a web link, text, images, audios, videos, animation, broadcast, or a combination thereof. The combined form may be repetitive, or randomly arranged. The user interface may be a default user interface or a user defined one. A user interface may be designed according to a user's own habits and preferences, including without limitation to the color, size, layout and style settings of the user interface.

The above description of the user interface is merely exemplary embodiments, and should not be understood as the only embodiments. Obviously, those skilled in the art, after understanding the basic principles of the user interface, may modify the form and details of the particular methods and operations of implementing the user interface without departing from the principles. Such modifications and variations are still within the scope of the present disclosure described herein. For example, the user interface may display to a user the sentiment types of information including without limitation to the sentiment type of the whole information, the sentiment type of one sub-class of information, or the sentiment types of multiple sub-classes of information. The user interface may display to a user the trend of the sentiment types of information including without limitation to the trend of the sentiment type of the whole information, the trend of the sentiment type of one sub-class of information, or the trend of the sentiment types of multiple sub-class information. The user interface may display to a user the subscribed information and provide a reminder to the user by means of text, sound, an image, a video, vibration, a dynamic pop-up box, or the like. The shapes of a pop-up box may include but not be limited to a circle, a square, a rectangular, a diamond, an ellipse, or the like. User may select subscribed information after sentiment analysis to view based on the reminder.

In some embodiments, the system may further include an update module, which may update the lexicons and repositories of the database 104, and/or may update the parameters of the algorithms used by the ambiguity analysis model 312 and the sentiment analyzer 311. The update module may acquire need information by various means. Information may be retrieved in a centralized manner or in a distributed manner, locally or remotely, via a wired connection or wirelessly, manually or automatically, or a combination thereof. It should be noted that the above description of acquiring information provides merely exemplary embodiments, and should not be understood as the only embodiments. Obviously, those skilled in the art, after understanding the basic principles of the method and system for sentiment analysis of information based on ambiguity analysis, may modify the form and details of information acquisition without departing from the principles. Such modifications and variations are still within the scope of the present disclosure described herein.

The information may include but not be limited to terminologies, correlatives of terminologies, information containing terminologies, algorithm parameters used in an ambiguity analysis or a sentiment analysis. The terminologies may include but not be limited to terms of art, full names, acronyms, codes, synonyms, abbreviations of a particular field, or the like, or the combination thereof. The correlatives of terminologies may include but not be limited to terms of art, nouns, verbs, adjectives, phrases, short sentences, terms, synonyms, antonyms, common collocations, derivatives, compound words, or the like, or a combination thereof. The information containing terminologies may include but not be limited to dictionaries, news, research reports of relevant companies, announcements, product manuals, webpages of relevant websites, or the like. The parameters of an algorithm used in the ambiguity analysis or the sentiment analysis may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, etc.

In some embodiments, the update module may update the database 104 with the acquired information. The update module may train a model with the information of the updated database 104. Besides, the update module may use algorithm parameters used in the ambiguity analysis or the sentiment analysis to update a model directly. The above description of the update module and the acquisition unit provides merely exemplary embodiments, and should not be understood as the only embodiments. Obviously, those skilled in the art, after understanding the basic principles of the update module and the acquisition unit, may modify the contents of the update module and the acquisition unit without departing from the principles. Such modifications and variations are still within the scope of the present disclosure described herein.

The updating may be performed regularly or irregularly. It may be set by the system or by a user so that the update module updates regularly. The regular updating may be performed at a frequency including but not limited to a few hours, days, weeks, months, quarters, years, or the like, or a combination thereof. The irregular updating may be performed on workdays or holidays of different countries, in the morning, at noon, in the evening, or the like. The information sources of the update module may include but not be limited to dictionaries, news media, research reports about relevant companies, announcements, product manuals, microblogs, WeChat, social network sites, forums, publishers, and webpages of relevant websites, or the like. Updated contents may be previously existing contents or new ones. For example, in some embodiments, the system may check financial websites or other news media regularly. If one piece of news contains existing information such as a stock name, and contains new contents associated with the stock name, the update module may perform an update based on the new contents. If the stock name is changed, the update module may perform an update accordingly. If alternative names of the stock name appear, the update module may also perform an update. The above description of the update module, the update frequency, and the updated contents provides merely exemplary embodiments, and should not be understood as the only embodiments. Obviously, those skilled in the art, after understanding the basic principles of the update module, the update frequency, and the updated contents, may modify the form and details of the update module, the update frequency, and the updated contents without departing from the principles. Such modifications and variations are still within the scope of the present disclosure described herein.

The update module may update a model of the ambiguity analysis module 301 or the sentiment analysis module 306 directly, or may update with the updated information, and may update after a particular amount of information has been accumulated.

The updating of the ambiguity analysis model 312 of the ambiguity analysis module 301 may be verified by an operator, or automatically, or a combination thereof. The ambiguity analysis model 312 may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, or the like. For example, the system may check financial websites or other news media regularly. If one piece of news contains information such as a stock name, and contains information associated with the stock name, the update module may update the repository 511. The ambiguity analysis module 301 may analyze the ambiguity of the information, and if the information is ambiguous, it may perform the operation of acquiring ambiguous collocations. After the ambiguous collocations of the ambiguous information are acquired, it may be verified by an operator to determine whether the ambiguous collocations to be strongly ambiguous collocations. After the verification, those collocations may be used by the update module to update the ambiguity analysis model 312.

The above description of the ambiguity analysis module 301 and the ambiguity analysis model 312 provides merely exemplary embodiments, and should not be understood as the only embodiments. Obviously, those skilled in the art, after understanding the basic principles of the ambiguity analysis module 301 and the ambiguity analysis model 312, may modify the process of updating the ambiguity analysis module 301 and the ambiguity analysis model 312 without departing from the principles. Such modifications and variations are still within the scope of the present disclosure described herein.

The updating of the sentiment analyzer 311 of the sentiment analysis module 306 may be verified by an operator, or automatically, or by a combination thereof. The sentiment analyzer 311 may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, or the like. For example, the system may check financial websites or other news media regularly. After a sentiment analysis, strongly positive and strongly negative collocations of the information may be obtained, and these collocations may be used to update the set of sentimental collocations. Then the updated set of sentimental collocations may be used by the update module to update the models of the sentiment analysis module.

The above description of the sentiment analysis module 306 and the sentiment analyzer 311 provides merely exemplary embodiments, and should not be understood as the only embodiments. Obviously, those skilled in the art, after understanding the basic principles of the sentiment analysis module 306 and the sentiment analyzer 311, may modify the process of updating the sentiment analysis module 306 and the sentiment analyzer 311 without departing from the principles. Such modifications and variations are still within the scope of the present disclosure described herein.

Figure 6:
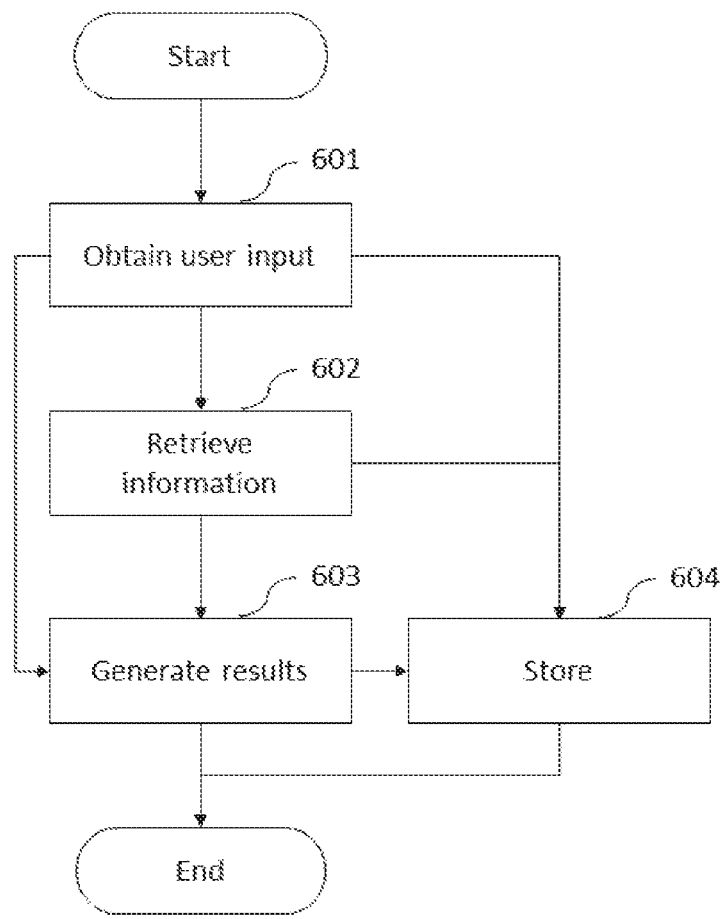
FIG. 6 is a flowchart illustrating a process for the interaction between a user and the system according to some embodiments of the present disclosure.

FIG. 6 is a flowchart illustrating a process of user interaction. It should be noted that the process described below is only some embodiments of the present disclosure. It should be apparent to those having ordinary skill in the art to apply the present disclosure to other similar scenarios according to the description. The system may acquire user input (601). The operation may be performed by the input and output module 103. A device used to input may include but not be limited to a keyboard, a pointing device (such as a pointing stick, a mouse, a touchpad, or a trackball), a voice recognition device, a graphic and image recognition device, or the like. The input format may include but not be limited to numbers, characters, symbols, text, sound, graphics, images, videos and so on. The user input may be stored (604). The system may store the user input in the storage unit 403 of the input and output module 103, or other storage modules or units (e.g., the storage module 315 of the processing module 102, the database 104). In some embodiments, it is necessary to store. In other embodiments, it is optional or unnecessary to store. The storage of the user input may be permanent or temporary, and the system may store the whole or part of the user input. In some embodiments, the system may use the stored user input to obtain the user habits, and then learn them intelligently to prompt candidate words. After acquiring the user input, the system may acquire information based on the user input (602), then generate output results according to the acquired information (603). The operation 603 may be performed by the input and output module 103. The system may or may not display the results to a user through a peripheral device. In some embodiments, it may be displayed. In some embodiments, it may be optional or unnecessary to display. The system may retrieve information in database 104 or storage units of other modules (e.g. the storage module 315 of the processing module 102), or network 105 according to user input. The information may be stored (604). The system may store the information in the storage unit 403 of the input and output module 103, or other storage modules or units (e.g., the storage module 315 of the processing module 102, the database 104). The storage of the information may be permanent or temporary, and the system may store all or some of the information. In some embodiments, it may be stored. In other embodiments, it may be optional or unnecessary to store. The stored information may or may not be subject to further analysis, such as an ambiguity analysis or a sentiment analysis. After retrieving relevant information, the system may generate output results (603). The operation 603 may be performed by the input and output module 103. The system may display the results to a user through a peripheral device. The display may be real-time or delayed, regular or irregular. In some embodiments, the user input may include periodic instructions (e.g., the instruction of subscribing particular information), and the system may recognize these instructions, and push or display the information that matches the user input to a user regularly or irregularly.

The above description of the user interaction provides merely exemplary embodiments, and should not be understood as the only embodiments. Obviously, those skilled in the art, after understanding the basic principles of the user interaction, may modify the contents of the needed information without departing from the principles. Such modifications and variations are still within the scope of the present disclosure described herein.

Figure 7:
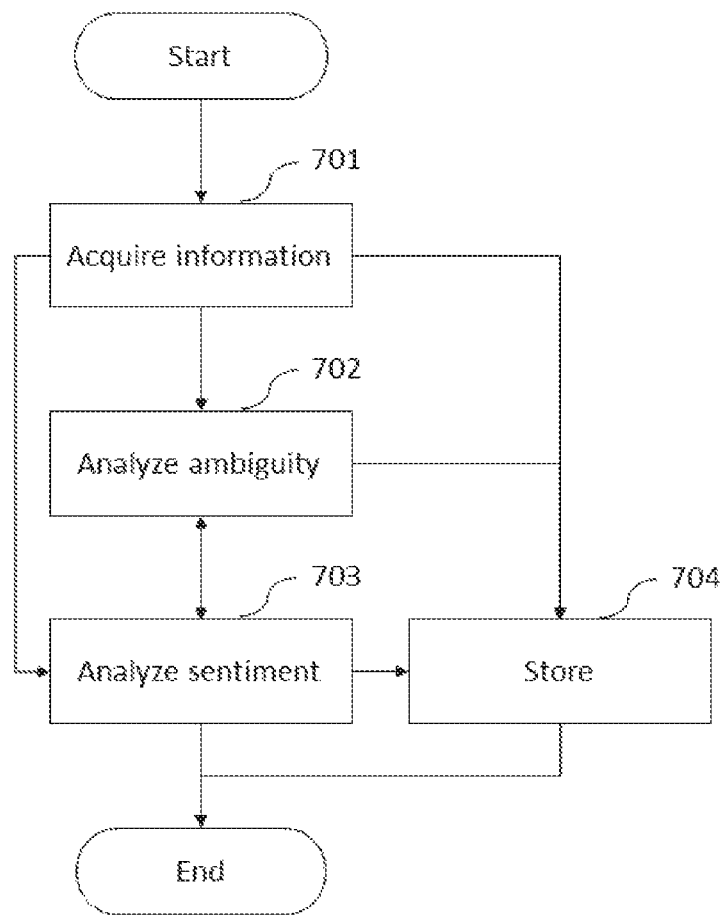
FIG. 7 is a flowchart illustrating a process for sentiment analysis of information according to some embodiments of the present disclosure.

FIG. 7 is a flowchart illustrating a process for sentiment analysis of information. The system may acquire information at first (701). The operation may be performed by the acquisition module 101, and the information may include but not be limited to a dictionary, news, a research report of a relevant company, an announcement, a product manual, a webpage of relevant websites, or the like. The field that the information belongs to may include but not be limited to sports, entertainment, economy, politics, culture, or the like. The format of the information may include but not be limited to text, images, audios, videos, or the like, or a combination thereof. A language used in the information may include but not be limited to Chinese, English, Japanese, Korean, French, German, or the like. The information may be retrieved from network 105, the database 104 or other modules. Based on the acquired information, the system may analyze whether the information is ambiguous, and generate the results of the ambiguity analysis (702). The operation 702 may be performed by the ambiguity analysis module 301 of the processing module 102. The information may be all or some of the acquired information. The process of analyzing ambiguity may be conducted by an operator, or automatically based on an ambiguity analysis model, or by a combination thereof. The ambiguity analysis model may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, or the like. The system may analyze the sentiment type of the ambiguity analysis results that are generated in the operation 702, and generate the results of the sentiment analysis (703). The operation 703 may be performed by the sentiment analysis module 306 of the processing module 102. In some embodiments, the system may analyze the sentiment type of the non-ambiguous information only, or may analyze the sentiment type of the ambiguous information. The system may omit the operation 702, and analyze the sentiment type of the acquired information directly, without the ambiguity analysis (701 and 703). The process of analyzing sentiment may be conducted by an operator, or automatically based on a sentiment analysis model, or by a combination thereof. The sentiment analysis model may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, or the like. After the sentiment analysis, the information may be classified into types including without limitation to positive information, negative information, neutral information, or the like. In addition, in some embodiments, the sequence of the ambiguity analysis and the sentiment analysis may be reversed, i.e., the acquired information may undergo the sentiment analysis first, and then the results of the sentiment analysis may undergo ambiguity analysis (701, 703, and 702). The intermediate results and the final results of the operations may be stored according to particular storage mechanisms (704). The storage mechanisms may include but not be limited to sequential storage, linked storage, indexed storage, hashing storage, or the like. The results may be stored in the storage module 315, the storage unit 203, or the database 104, etc.

The above description of the method of sentiment analysis based on ambiguity analysis provides merely exemplary embodiments, and should not be understood as the only embodiments. Obviously, those skilled in the art, after understanding the basic principles of the method of sentiment analysis based on ambiguity analysis, may modify the contents of the needed information without departing from the principles. Such modifications and variations are still within the scope of the present disclosure described herein.

Figure 8:
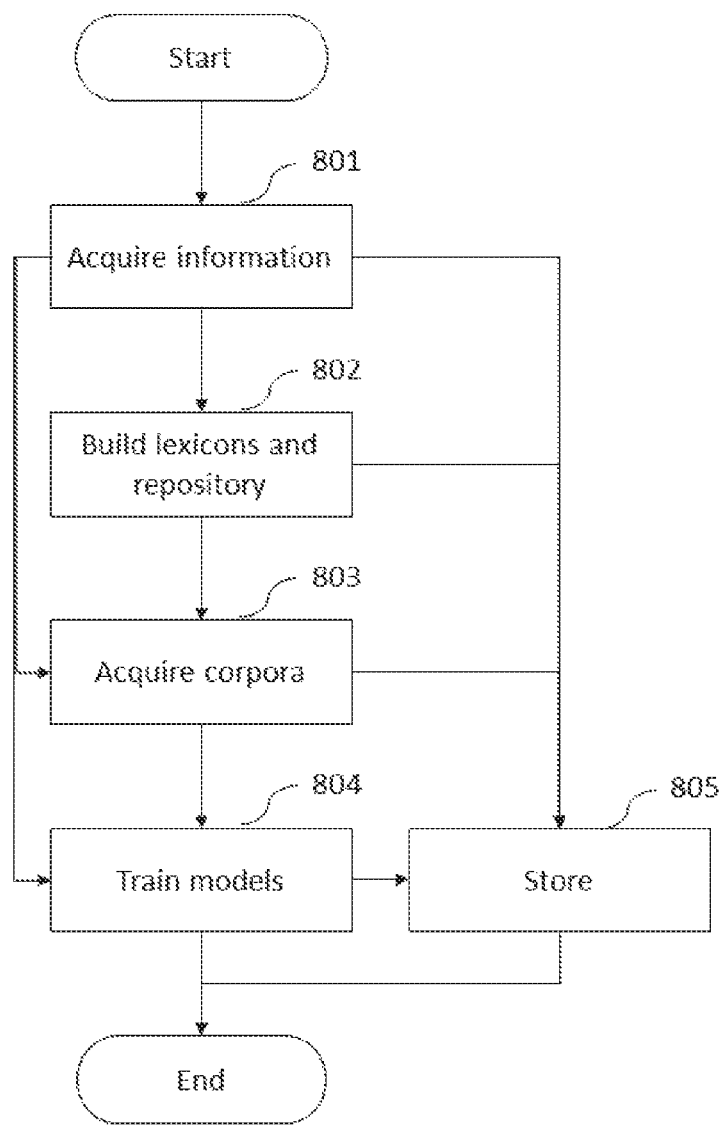
FIG. 8 is a flowchart illustrating a process for training models according to some embodiments of the present disclosure.

FIG. 8 is a flowchart illustrating a process for training models. The system may acquire information via a module with acquisition function (801). The module with acquisition function may be the acquisition module 101, the acquisition unit 301 of the ambiguity analysis module 301, the acquisition unit 307 of the sentiment analysis module 306, or the like. The information may be retrieved from the storage module 315, the database 104, or network 105. The information may include but not be limited to terminologies related to a field, words strongly related to the terminologies, information containing the terminologies and words with sentiment, or the like, or a combination thereof. The fields may include but not be limited to sports, entertainment, economy, politics, culture, or the like. The terminologies in a field may include but not be limited to terms of art, full names, acronyms, codes, synonyms, abbreviations of a particular field, or the like. The words strongly related to the terminologies may include but not be limited to nouns, verbs, adjectives, phrases, collections, synonyms, antonyms, derivatives, compound words, or the like, or a combination thereof. The information containing the terminologies may include but not be limited to a dictionary, news, a research report regarding to a company, an announcement, a product manual, a webpage of relevant websites, or the like, or a combination thereof. The format of the information may include but not be limited to text, images, audios, videos, or the like, or a combination thereof. A language used in the information may include but not be limited to Chinese, English, Japanese, Korean, French, German, or the like, or a combination thereof.

The system may construct lexicons and a repository in 802. The operation 802 may be performed by the processing module 102. The lexicons may include but not be limited to the keyword lexicon 501 and the sentiment lexicon 505. The keyword lexicon 501 may include but not be limited to one or more keyword dictionaries 502 that include terminologies, one or more correlative dictionaries 503 that include correlatives of the terminologies, and one or more ambiguity lists 504 that are generated by auditing the keyword dictionary 502. The sentiment lexicon 505 may include but not be limited to one or more sentimental word libraries 506 and one or more sentimental collocation libraries 507. The information may contain the terminologies in the keyword dictionary 502. Based on the results of the operation 802, the system may acquire corpus via the corpus acquisition unit 305 of the ambiguity analysis module 301 and the corpus acquisition unit 310 of the sentiment analysis module 306 (803). The operation 803 may be performed by the processing module 102. The corpus may be acquired by matching or scoring the acquired information. The acquired corpus may be used to train models (804) including without limitation to the ambiguity analysis model 312 and the sentiment analyzer 311. The ambiguity analysis model 312 may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, or the like. The sentiment analyzer 311 may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, or the like. Besides, the acquired information may be verified as ambiguity corpus or sentiment corpus by an operator directly (801 and 803), and the acquired information may be used to train models directly (801 and 804) without the process of the operations 802 and 803. The intermediate results and the final results of the operations may be stored using particular storage mechanisms (805). The storage mechanisms may include but not be limited to sequential storage, linked storage, indexed storage, hashing storage, or the like. The results may be stored in the storage module 315, the storage unit 203, or the database 104.

The above description of the process of training models provides merely exemplary embodiments, and should not be understood as the only embodiments. Obviously, those skilled in the art, after understanding the basic principles of the process of training models, may modify the contents of the needed information without departing from the principles. Such modifications and variations are still within the scope of the present disclosure described herein.

Examples

Figure 9:
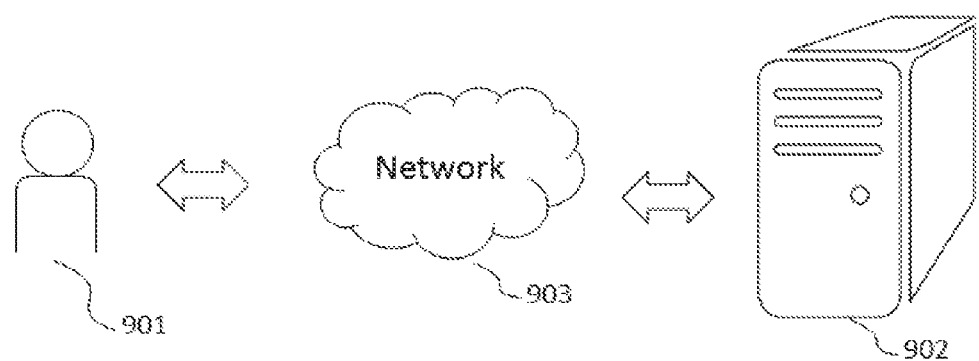
FIG. 9 is a block diagram illustrating a use scenario according to some embodiments of the present disclosure.

FIG. 9 is a block diagram illustrating a usage scenario of the present disclosure. The sentiment analysis system 902 and a user 901 may be connected to network 902. The sentiment analysis system 902 may be a server, or a server group, and it may be centralized or distributed. The network 903 may be wired or wireless, a local area network or a wide area network.

In one example of the present disclosure, the user 901 may input an object name such as a stock name, a future name, a bond name, etc., via the input and output module 103 (see FIG. 1). The object name may be transmitted to the sentiment analysis system 902 via the network 903, and may be analyzed by the sentiment analysis system 902. After being analyzed by the sentiment analysis system 902, the object name may be identified. The processing module 102 of the system may retrieve from the database 104 (see FIG. 1) a set of the articles containing the object name. Each article in the set has a different sentiment type for the object name, the processing module 102 of the system may classify the articles in the set based on their sentiment types, for example, the results may include a positive article, a positive index of each positive article, a negative article, a negative index of each negative article, a neutral article, etc. Afterwards, the set of articles may be transmitted to the input and output module 103 to display to the user 901.

In another example of the present disclosure, the user 901 may input an object name, such as a stock name, a future name, a bond name, etc., via the input and output module 103 (see FIG. 1). The object name may be transmitted to the sentiment analysis system 902 via the network 903, and may be analyzed by the sentiment analysis system 902. After being analyzed by the sentiment analysis system 902, the object name may be identified. The system may retrieve information containing the user input, and the process may be performed by the acquisition module 101. The information may be transmitted to the processing module 102 (see FIG. 2) to be subject to an ambiguity analysis to screen out non-ambiguous information for sentiment analysis. The system may determine whether the user input is ambiguous or not at first, and if not, the user input may undergo sentiment analysis directly. The results may include a positive article, a positive index of each positive article, a negative article, a negative index of each negative article, a neutral article, etc. After being classified, the set of articles may be transmitted to the input and output module 103 to display to the user 901.

In another example of the present disclosure, the user 901 may input two object names such as stock names, future names, bond names, etc., via the input and output module 103 (see FIG. 1). The sentiment analysis system 902 may analyze and identify the object names, and then may return a set of articles that contain the object names and have underwent sentiment analysis. The set may be displayed to the user 901 via the input and output module 103. The user 901 may obtain not only the sentiment types of the articles, but also other information, such as the number of the articles in which the two object names have the same sentiment type, a comparison of the numbers of positive articles in which each of the two object names appears in one week or in one month, a comparison of the numbers of negative articles in which each of the two object names appears in one year. On the basis of the above mentioned data, the user 901 may make an decision efficiently.

The above description of the information provides merely exemplary embodiments, and should not be understood as the only embodiments. Obviously, those skilled in the art, after understanding the basic principles of the present disclosure, may modify the form and details without departing from the principles and structures. Such modifications and variations are still within the scope of protection of the claims of the present disclosure described herein. For example, a user may input multiple object names, and the results returned may include comparative data of the multiple object names.

Figure 10:
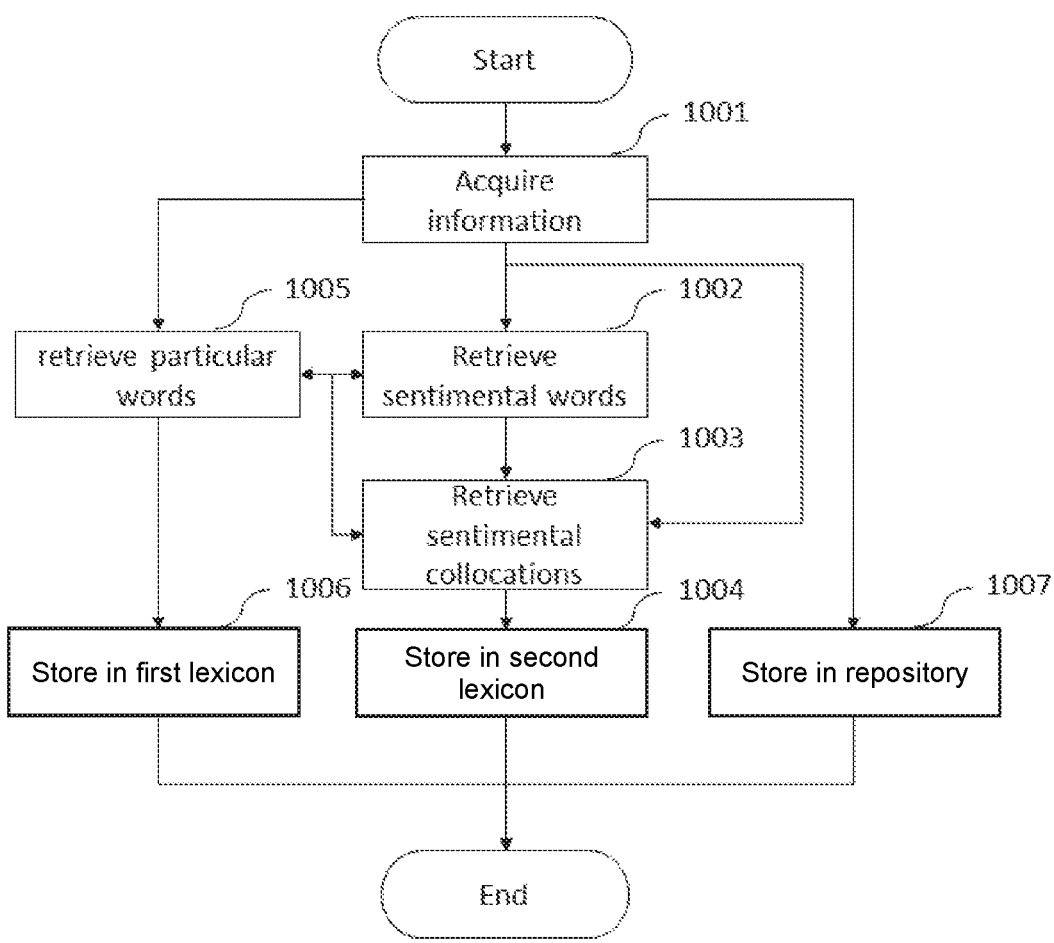
FIG. 10 is a flowchart illustrating a process for acquiring information according to some embodiments of the present disclosure.

FIG. 10 shows a flowchart illustrating a process for acquiring information. It should be noted that process described below provides only some exemplary embodiments of the present disclosure. It should be apparent to those having ordinary skill in the art to apply the present disclosure to other similar scenarios according to the process. Information may be acquired in 1001. The operation may be performed by the acquisition unit 201 of the acquisition module 101. The information sources may be local, for example, the information may be stored in the storage unit 203 of the acquisition module 101 or the database 104. The information may be retrieved from the network 105, such as the open internet or a local area network. The information may include but not be limited to dictionaries, news, research reports about a relevant company, announcements, product manuals, webpages of relevant websites, or the like, or a combination thereof. The information acquired by the acquisition unit 201 may be stored in the storage unit 203 of the acquisition module 101, or the repository 511 of the database 104 (1007). The information acquired by the acquisition unit 201 may be transmitted to the processing unit 202. In 1005, terminologies may be retrieved. The operations may be performed by the processing unit 202. In 1002, sentimental words may be retrieved. The operation may be performed by the processing unit 202. In 1003, sentimental collocations may be retrieved. The operation may be performed by the processing unit 202. The terminologies may include keywords and words strongly related to the keywords. The terminologies may include but not be limited to terms of art, full names, acronyms, codes, synonyms, abbreviations of a particular field, or the like. Words strongly related to the keywords may include but not be limited to terms of art, nouns, verbs, adjectives, phrases, short sentences, terms of art, synonyms, antonyms, common collocations, derivatives, compound words related to a terminology, or the like. The process of retrieving information may be conducted simultaneously or sequentially. Algorithms used to retrieve information may include but not be limited to a pointwise mutual information (PMI), a logarithmic likelihood ratio calculation algorithm, or the like. The process of retrieving information may be performed simultaneously, sequentially, or a combination thereof. The operations may be conducted in any sequential order or simultaneously where appropriate. For example, in some embodiments, the system may retrieve terminologies (1005), retrieve sentimental words (1002), and retrieve sentimental collocations (1003); Operations 1002 and 1003 may be conducted simultaneously or in a sequential order, that is to conduct 1002 before/after 1003. Besides, any individual operation may be omitted from a method without departing from the principles and scopes of the acquisition process described herein. Aspects of the above described embodiments may be combined with aspects of the above described any other embodiments to generate further embodiments without losing the desired effects. Obviously, those skilled in the art, after understanding the basic principles of the acquisition module, may modify the form and details without departing from the principles and structures. Such modifications and variations are still within the scope of protection of the claims of the present disclosure herein.

The terminologies retrieved by the processing unit 202 may be stored in the keyword lexicon 501 of the database 104 (1006), and the sentimental words and the sentimental collocations may be stored in the sentiment lexicon 505 of the database 104 (1004). Operations of the above described method may be carried out simultaneously or in any suitable order under suitable conditions. Additionally, an individual operation may be omitted from any method without departing from the principles and scopes of the above described method. Aspects of the above described embodiments may be combined with aspects of the above described any other embodiments to generate further embodiments without losing the effects being sought. Obviously, those skilled in the art, after understanding the basic principles of the acquisition module, may modify the form and details without departing from the principles and structures. Such modifications and variations are still within the scope of protection of the claims of the present disclosure.

Figure 11:
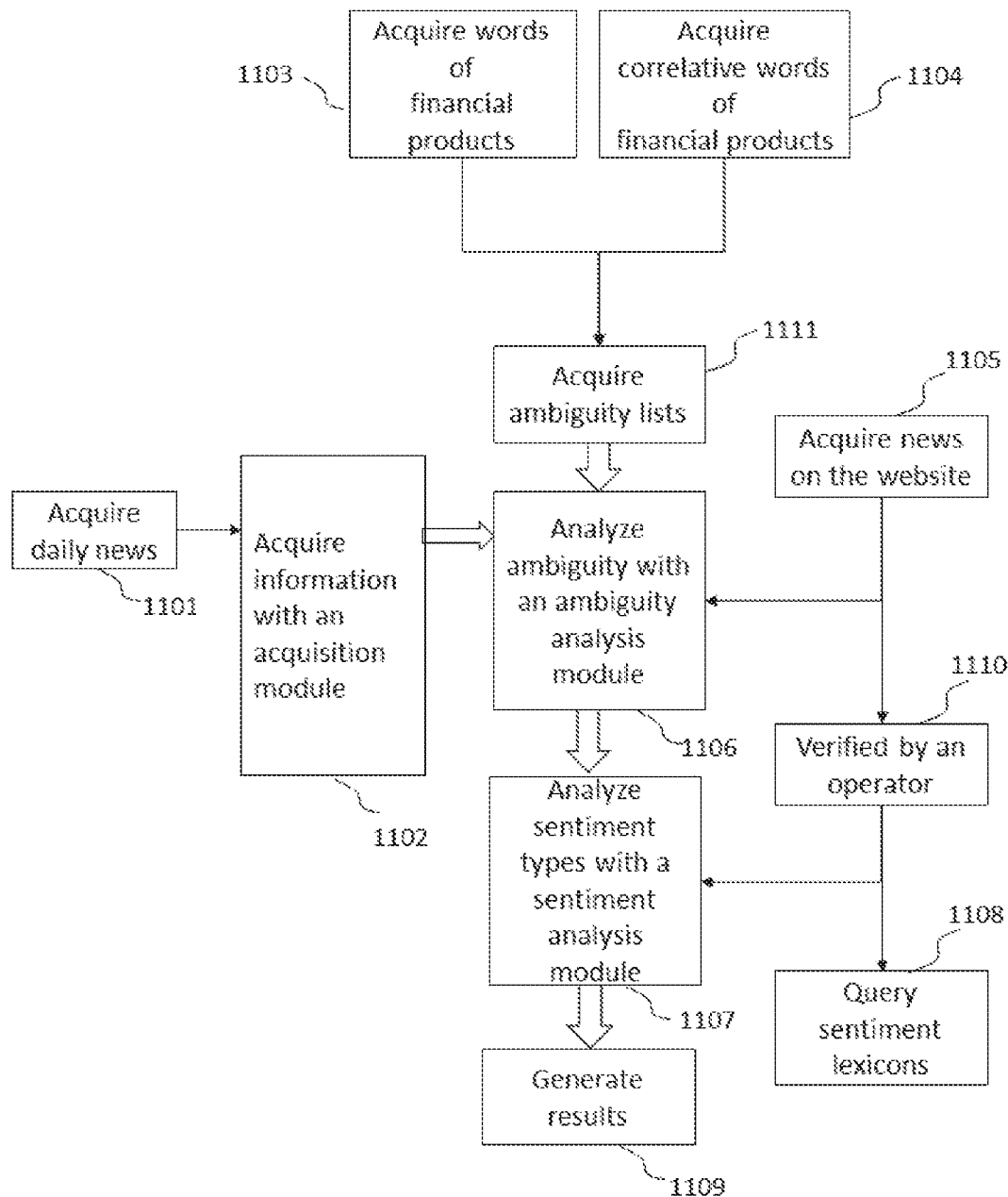
FIG. 11 is a flowchart illustrating a process for applying the system in the field of financial products according to some embodiments of the present disclosure.

FIG. 11 is a flowchart illustrating an application of the system in the stock news field. The system may acquire daily news, an online dictionary, a specialized dictionary (1101 and 1102) and other information to acquire the words of financial products, correlatives of financial products and sentiment lexicons (1103, 1104, and 1108). Operations 1101, 1102, 1103, 1104, and 1108 may be performed by the acquisition module 101. The acquired information may be stored in the database 104, or other storage units or modules in the system (e.g. the storage unit 203). Then the system may acquire ambiguity lists in 1111, and analyze ambiguity of the acquired stock news (1106). Operation 1106 may be performed by the ambiguity analysis module 301 of the processing module 102. The non-ambiguous stock information screened out may be analyzed in the sentiment analysis module 306 of the processing module 102. The ambiguity analysis of the news on the website may be performed automatically, or by an operator, or by a combination thereof. After acquiring the non-ambiguous stock information, the system may query the sentiment lexicons (1108) to analyze and mark the sentiment types of the non-ambiguous stock information (1107). The operation 1108 and the operation 1107 may be performed by the sentiment analysis module 306 of the processing module 102. The process for analyzing the sentiment types of the non-ambiguous stock news may be performed automatically, or by an operator (1110), or by a combination of thereof. The stock news marked with sentiment types may be generated and displayed to user in categories of sentiment labels.

Besides, the acquisition module 101 may acquire daily news regularly from which stock names and correlative stock names may be acquired to expand the sources of stock names and relevant stock names. The acquisition module 101 may also retrieve the sentences containing stock information from daily news to train and update the models of the ambiguity analysis module 301 and the sentiment analysis module 302 of the processing module 102. The training and updating may be verified by an operator, or automatically, or by a combination thereof.

The above description of an application of the system in the stock news field provides merely exemplary embodiments, and should not be understood as the only embodiments. Obviously, those skilled in the art, after understanding the contents and principles of the present disclosure, may apply the system to other fields and modify the form and details of the application of the system in the field of stock news without departing from the principles. Such modifications and variations are still within the scope of the present disclosure described herein.

Figure 12:
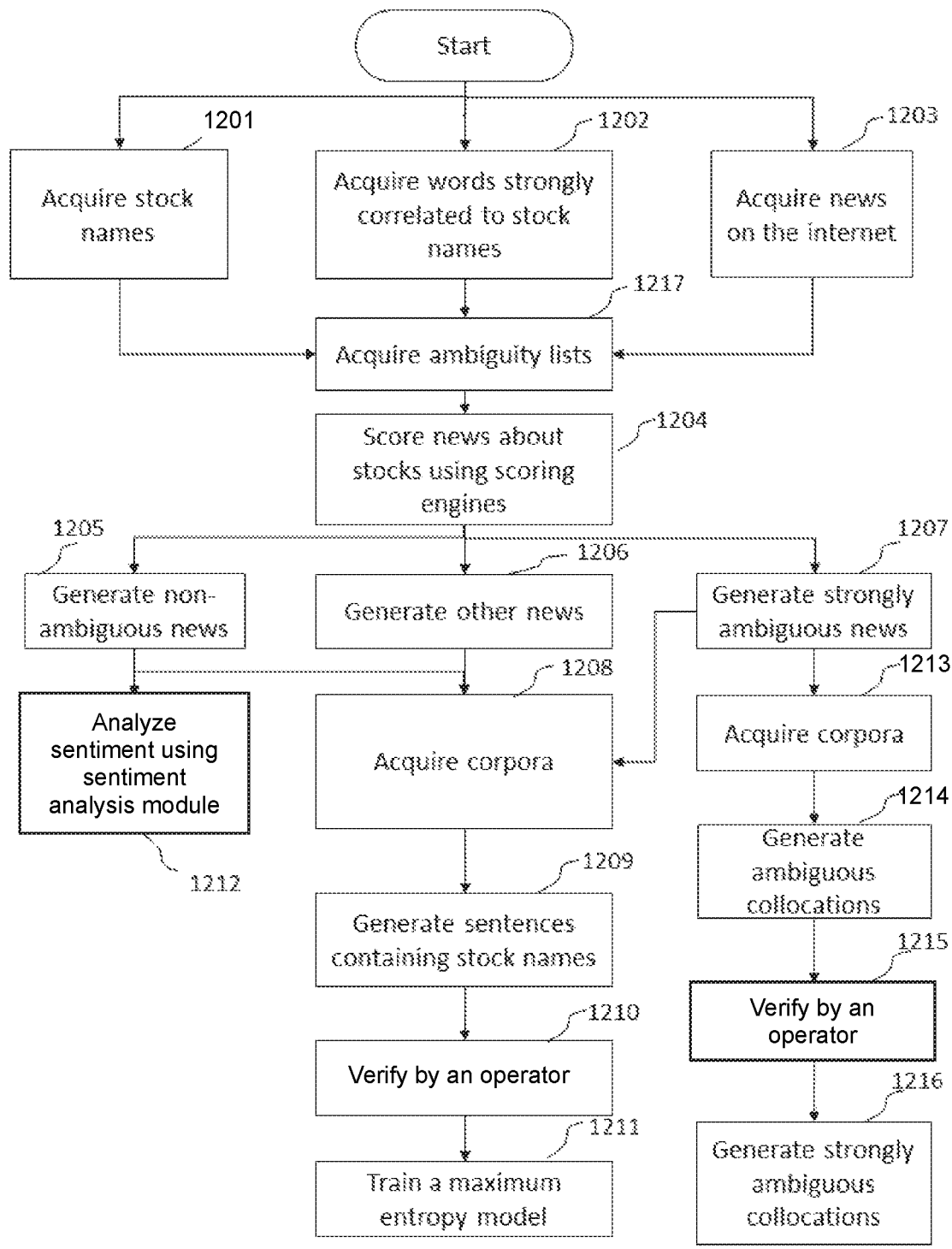
FIG. 12 is a flowchart illustrating a process for an ambiguity analysis in a financial product according to some embodiments of the present disclosure.

FIG. 12 is a flowchart illustrating a process for an ambiguity analysis in a financial product. In such embodiments, the acquisition unit 302 may acquire stock names, words strongly correlated to stock names, ambiguous stock names, the news on the internet, and other information (1201, 1202, and 1203). The information may be retrieved from the network 105 or the storage module 315. The information may be retrieved from the database 104. The system may acquire ambiguity lists in 1217. This operation may be performed by the ambiguity analysis module 301. The matching unit 303 and the processing unit 304 of the ambiguity analysis module 301 may score the stock news according to the stock names, words strongly correlated to stock names, and ambiguous stock names. Based on the scoring results, the news may be classified into non-ambiguous news, strongly ambiguous news, and other news (1205, 1206, and 1207). The non-ambiguous news may be transmitted to the sentiment analysis module 306 for processing.

The strongly ambiguous news may be used to retrieve ambiguous collocations by the corpus acquisition unit 305 of the ambiguity analysis module 301 (1213 and 1214). An ambiguous collocation refer to a combination of an ambiguous word and a correlative. The strongly ambiguous collocations may be obtained when an operator verifies the ambiguous collocations (1215 and 1216). The strongly ambiguous collocations may be used to train the ambiguity analysis model 312 (1211), or determine whether information is ambiguous or not. If a piece of information contains a strongly ambiguous collocation, it may be determined to be ambiguous. From the non-ambiguous news, strongly ambiguous news and other news obtained by scoring, the sentences containing stock names may be acquired by the corpus acquisition unit 305 (1208 and 1209) and these sentences may be marked as ambiguous or non-ambiguous by an operator (1210). The results may be used to train the ambiguity analysis model 312 (1211). The ambiguity analysis model may include but not be limited to a maximum entropy model.

The above description of ambiguity analysis provides merely exemplary embodiments, and should not be understood as the only embodiments. Obviously, those skilled in the art, after understanding the basic principles of ambiguity analysis, may modify the form and details of the particular methods and operations of implementing the ambiguity analysis without departing from the principles. Such modifications and variations are still within the scope of the present disclosure described herein.

Figure 13:
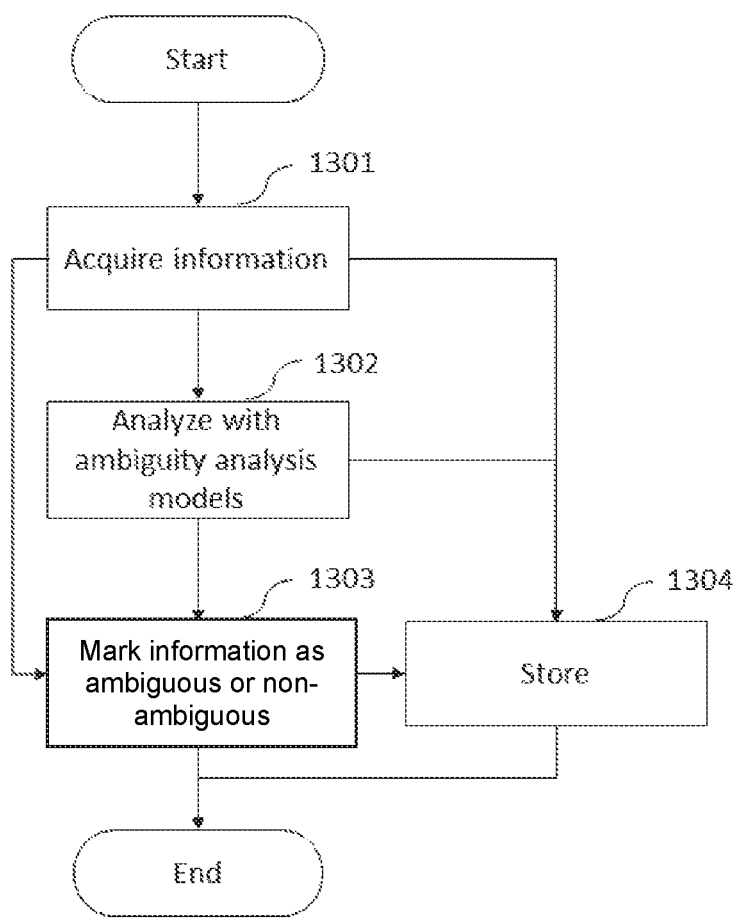
FIG. 13 is a flowchart illustrating a process for an ambiguity analysis according to some embodiments of the present disclosure.

FIG. 13 is a flowchart illustrating a process for an ambiguity analysis according to some embodiments of the present disclosure. It should be noted that the process described below is only an exemplary embodiment of the present disclosure. It should be apparent to those having ordinary skill in the art to apply the present disclosure to other similar scenarios according to the description. To analyze ambiguity, the system may acquire information first (1301). The information may be acquired by the acquisition module 101 or other units or modules that are capable of acquiring information (e.g., the acquisition unit 302 of the ambiguity analysis module 301). The information may be acquired from some storage modules (e.g., the database 104, other storage units). The information may include but not be limited to dictionaries, news, research reports of a relevant company, announcements, product manuals, webpages of relevant websites, or the like, or a combination thereof. The forms of the information may include but not be limited to text, images, audios, videos, or the like, or a combination thereof. The languages used in the information may include but not be limited to Chinese, English, Japanese, Korean, French, German, or the like, or a combination thereof. The information may be retrieved from the network 105 directly, or be retrieved from the repository 511 of the database 104.

The retrieved information may be analyzed using the ambiguity analysis model 312 (1302). The ambiguity model may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, or the like. The analyzed information may be marked as ambiguous or non-ambiguous (1303). In addition, the system may mark the retrieved information directly by an operator without analyzing based on the ambiguity analysis model (1301 and 1303). The intermediate results and the final results of the operation may be stored according to a particular storage mechanism. The storage mechanisms may include but not be limited to sequential storage, link storage, index storage, hashing storage, or the like. The results may be stored in the storage module 315, the storage unit 203, or the database 104.

The above description of ambiguity analysis provides merely exemplary embodiments, and should not be understood as the only embodiments. Obviously, those skilled in the art, after understanding the basic principles of ambiguity analysis, may modify the form and details of the particular methods and operations of implementing the ambiguity analysis without departing from the principles. Such modifications and variations are still within the scope of the present disclosure described herein.

Figure 14:
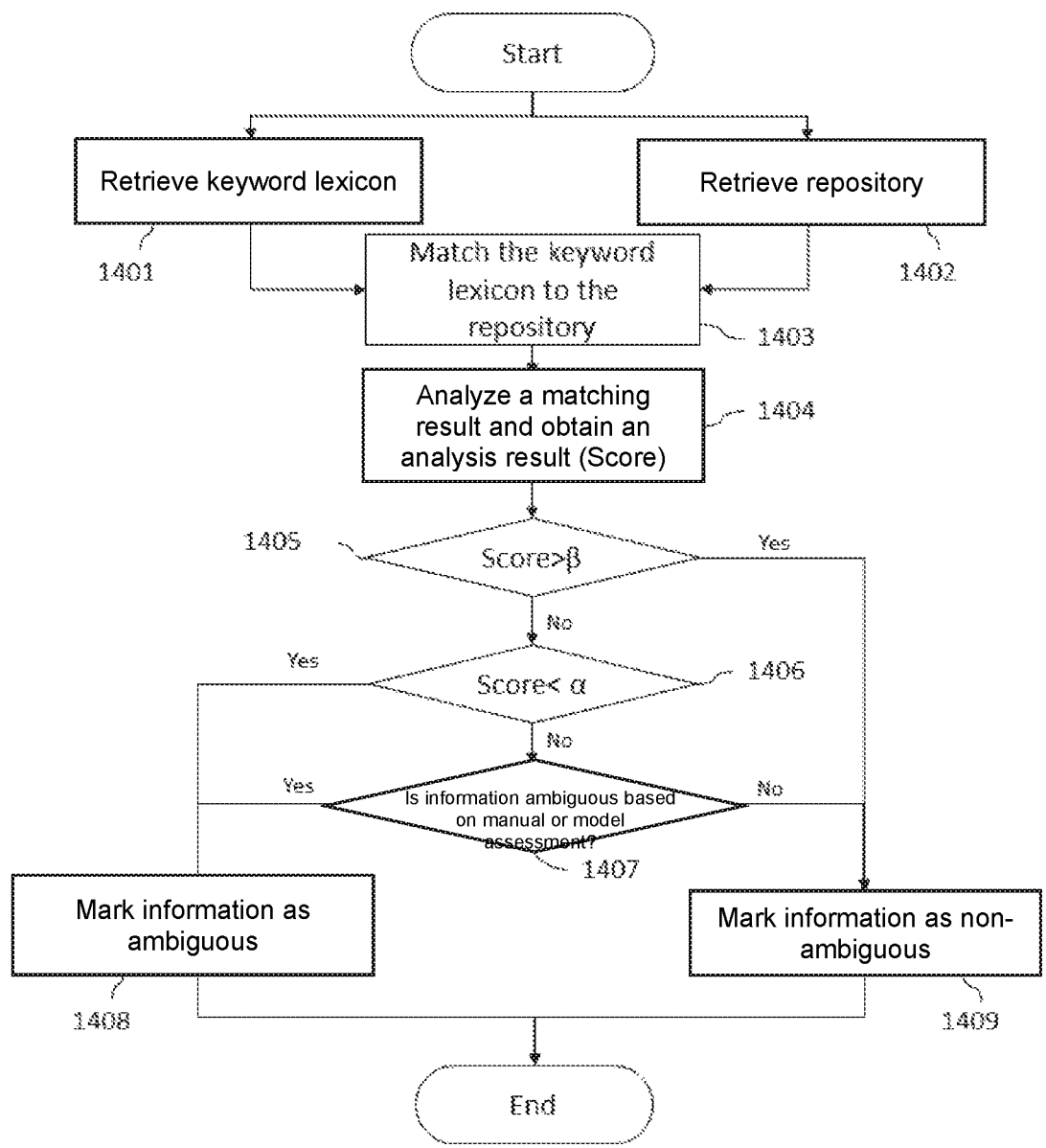
FIG. 14 is a flowchart illustrating a process for an ambiguity analysis according to some embodiments of the present disclosure.

FIG. 14 shows a process for the ambiguity analysis according to some embodiments of the present disclosure, which is verified by operators. It should be noted that process described below is only one embodiment of the present disclosure. It should be apparent to those having ordinary skill in the art to apply the present disclosure to other similar scenarios according to the process. When analyzing ambiguity, the system may retrieve the keyword lexicon and the repository (1401 and 1402). Operations 1401 and 1402 may be performed by the acquisition unit 302. The keyword lexicon may include but not be limited to one or more keyword dictionaries 502, one or more correlative dictionaries 503 and one or more ambiguity lists 504. The keyword dictionary 502 may be configured to store terminologies. The terminologies may include but not be limited to terms of art, full names, acronyms, codes, synonyms and abbreviations of a particular field, or the like, or a combination thereof. The correlative dictionary 503 may be configured to store correlatives of the terminologies. The correlatives of the terminologies may include but not be limited to, for example, terms of art, names of executives, names of main products, nouns, verbs, adjectives, phrases, short sentences, terms in a particular field, synonyms, antonyms, common collocations, derivatives, compound words, or the like, or a combination thereof. The ambiguity list may be generated from the keyword dictionary subject to the verification by an operator. The repository may be configured to store information containing terminologies. The terminologies may belong to those fields including without limitation to sports, entertainment, economy, politics, culture, or the like, or a combination thereof. The information containing the terminologies may include but not be limited to dictionaries, news, research reports regarding to a company, announcements, product manuals, webpages of relevant websites, or the like, or a combination thereof.

In 1403, the system may match the keyword lexicon to the repository. The matching may be performed according to an algorithm including but not limited to a regular expression operation, a double-array trie algorithm, or the like. Operation 1403 may be performed by the matching unit 303. In 1404, the system may analyze the matching results and obtain the analysis result score. Operation 1404 may be performed by the processing unit 304. In some embodiments, the analysis result may be calculated by the following formula, $$\text{Score(news,stock)} = \Sigma \pm (\text{weight}_i \times \text{count}_i)/\text{doc\_len}, \quad (001)$$

wherein "news" may represent a particular piece of information; "stock" may represent a term of art; "i" may represent the ith term, a word strongly related to the term of art or an ambiguous term relating to the term of art; "weight" may represent the weight of the ith term, the word strongly related to the term of art or the ambiguous term relating to the term of art; "count" may represent the number of times the ith term appears; "doc_len" may represent the text length of the information.

However, it is possible that the information may just contain the term of art but not words strongly related to the term of art. Under this circumstance, a score is given according to whether the matched term of art appears in the ambiguity list:

If the matched term of art is ambiguous, Score(news, stock)=α;

If the matched term of art is non-ambiguous, Score(news, stock)=β.

At the same time, α and β are set as thresholds (1405), which may be fixed values or may be adjustable under certain circumstances. For example, these two thresholds may be defined by a user in order to adjust the sensitivity of the system. When a large amount of information is collected, the sensitivity of the system may be enhanced through increasing β or decreasing α to improve the accuracy of ambiguity determination. On the contrary, when a small amount of information is collected, the sensitivity of the system may be decreased through increasing α or decreasing β to improve the completeness of the information.

If the score obtained in operation 1404 is not less than β (1405), the information may be marked as non-ambiguous (1409); if the score is not more than α (1406), the information may be marked as ambiguous (1408); otherwise, a determination may be made as to whether the information is ambiguous by an operator or automatically based on a model (1408 and 1409). The models may include but not be limited to a decision tree, a Rocchio algorithm, a Naïve Bayes algorithm, a neural network model, a support vector machine algorithm, a linear least squares fit model, a K-nearest algorithm, a genetic algorithm, a maximum entropy model, or the like, or a combination thereof. The marking may be conducted by an operator or automatically, or a combination thereof.

In 1403, the system may match the news containing stock names to all or some of the information in the keyword lexicon. For example, the system may match the news to the correlative dictionary or a combination of the correlative dictionary and the ambiguity list. Besides, some operations in the process may be conducted in an order or simultaneously, e.g., operations 1401 and 1402. Additionally, some operations in the process may be unnecessary. For example, it may be carried out directly by the operator to determine whether the news is ambiguous and ignore the intermediate operations.

The above description of the process of ambiguity analysis under the operator's verification provides merely exemplary embodiments, and should not be understood as the only embodiments. Obviously, those skilled in the art, after understanding the basic principles of the ambiguity analysis under the operator's verification, may modify the form and details of the method and operations of conducting ambiguity analysis without departing from the principles. Such modifications and variations are still within the scope of the present disclosure described herein.

Figure 15:
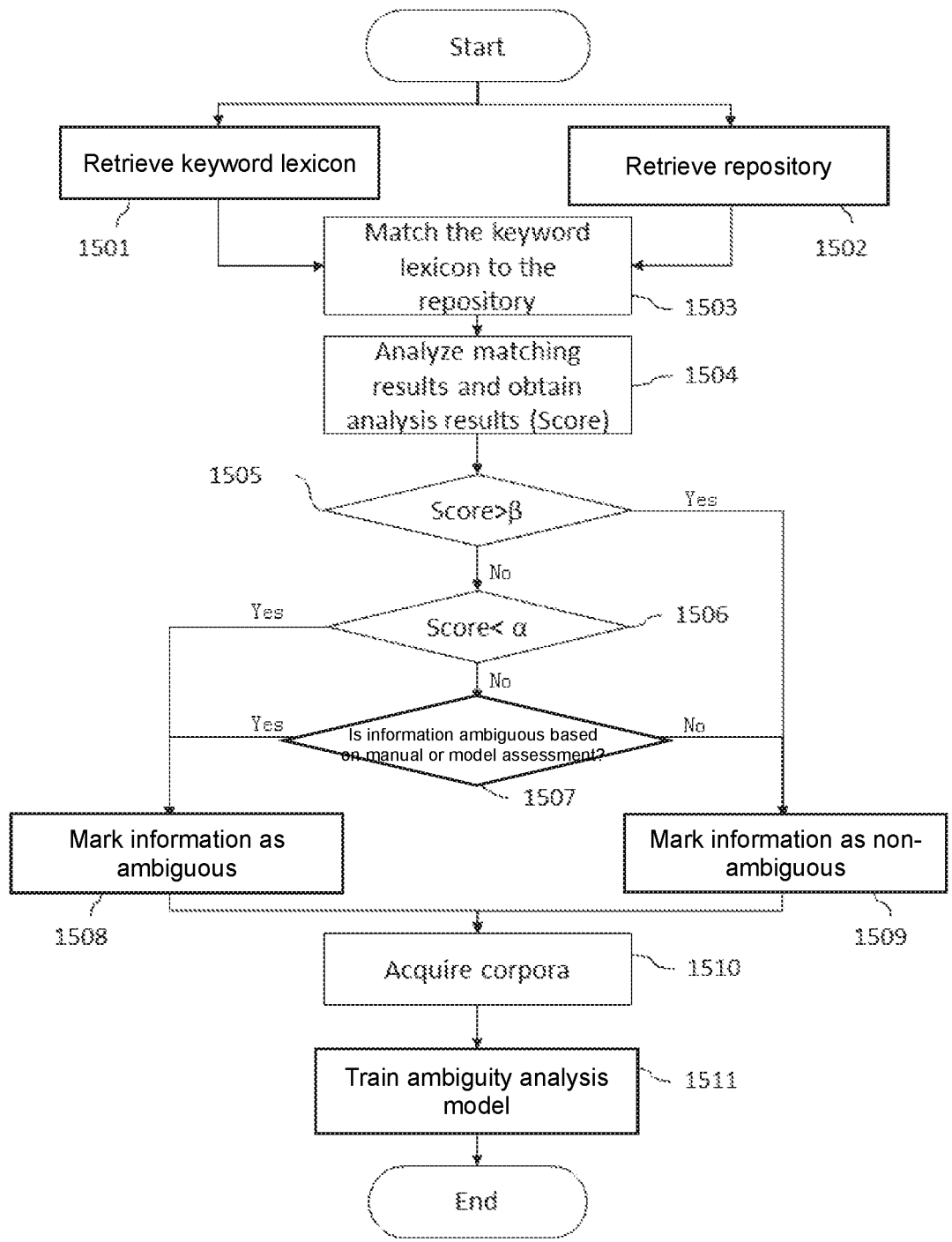
FIG. 15 is a flowchart illustrating a process for training an ambiguity analysis model according to some embodiments of the present disclosure.

FIG. 15 is a flowchart illustrating a process for training an ambiguity analysis model according to some embodiments of the present disclosure. It should be noted that process described below is only some embodiments of the present disclosure. It should be apparent to those having ordinary skill in the art to apply the present disclosure to other similar scenarios according to the process. When analyzing ambiguity, the system may retrieve a keyword lexicon and a repository from the database 104 (1501 and 1502), and the operations 1501 and 1502 may be performed by the acquisition unit 302. The keyword lexicon may include but not be limited to one or more keyword dictionaries 502, one or more correlative dictionaries 503 and one or more ambiguity lists 504. The keyword dictionary 502 may be configured to store terminologies. The terminologies may include but not be limited to terms, full names, acronyms, codes, synonyms and abbreviations of a particular field, or the like, or a combination thereof. The correlative dictionary 503 may be configured to store correlatives of the terminologies. The correlatives of the terminologies may include but not be limited to for example, terms, executive names, names of main products, nouns, verbs, adjectives, phrases, short sentences, terms in a particular field, synonyms, antonyms, common collocations, derivatives, compound words, or the like, or a combination thereof. The ambiguity list may be generated from the keyword dictionary verified by an operator. The repository may be configured to store information containing terminologies. The terminologies may belong to those fields including without limitation to, for example, sports, entertainment, economy, politics, culture, or the like, or a combination thereof. The information may include but not be limited to for example, dictionaries, news, research reports of a correlative company, announcements, product manuals, webpages of relevant websites, or the like, or a combination thereof. In 1503 the system may match the keyword lexicon to the repository. The matching may be performed based on an algorithm including but not limited to a regular expression operation, a double-array trie algorithm, or the like. The matching operation may be performed by the matching unit 303. In 1504 the system may analyze the matching results and obtain the analysis result Score. Operation 1504 may be performed by the processing unit 304. In some embodiments, the score may be calculated by the following formula, $$\text{Score(news,stock)}=\Sigma \pm (\text{weight}_i \times \text{count}_i)/\text{doc\_len}. \quad (002)$$

In this formula, "news" may represent a particular piece of information; "stock" may represent a term of art in the news; "i" may represent the ith term, a word strongly related to the term of art or an ambiguous term related to the term of art; "weight" may represent the weight of the ith term, the word strongly related to the term of art or the ambiguous term relating to the term of art; "count" may represent the number of the ith term appears; "doc_len" may represent the text length of the information.

However, it is possible that the information may just contain the term of art but not words strongly related to the term of art. Under this circumstance, a score is given according to whether the matched words appear in the ambiguity list:

If the matched term of art is ambiguous, Score(news, stock)=α;

If the matched term of art is non-ambiguous, Score(news, stock)=β.

At the same time, α and β may be set as thresholds (1505), which may be fixed values or may be adjusted under certain circumstances. For example, these two thresholds may be defined by a user in order to adjust the sensitivity of the system. When a large amount of information is collected, the sensitivity of the system may be enhanced through increasing β or decreasing α to improve the accuracy of ambiguity determination. On the contrary, when a small amount of information is collected, the sensitivity of the system may be decreased through increasing α or decreasing β to improve the completeness of the information.

Corpus acquisition for training the ambiguity analysis model:

(1) If the score obtained in operation 1504 is not less than β (1505), the information may be marked as non-ambiguous (1509). The process of marking may be conducted by an operator or automatically, or a combination thereof. The system may acquire corpora in operation 1510. Operation 1510 may be performed by the corpus acquisition unit 305. The acquired corpora may be the whole non-ambiguous information, the sentences containing terminologies or non-ambiguous phrases extracted from the information.

(2) If the score obtained in operation 1504 is less than α (1506), the information may be marked as ambiguous (1508). The process of marking may be conducted by an operator or automatically, or a combination thereof. The corpus acquisition unit 305 may acquire corpora (1510). The acquired corpus may be the whole ambiguous information, the sentences containing terminologies or ambiguous phrases extracted from the information.

(3) If the score obtained in operation 1504 is between α and β, an operator may determine whether the information is ambiguous or non-ambiguous and mark the information accordingly (1507, 1508, and 1509). The process of marking may be conducted by the operator or automatically, or a combination thereof. The system acquires corpora in operation 1510. The operation 1510 may be performed by the corpus acquisition unit 305. The acquired corpus may be the whole ambiguous information, the sentences containing particular names or ambiguous and non-ambiguous phrases extracted from the information.

In 1503, the system may match news containing stock names to all or some of the information in the keyword lexicon. For example, the system may match the news to the correlative dictionary or a combination of the correlative dictionary and the ambiguity list. Besides, some operations in the process may be conducted in order or simultaneously, like operations 1501 and 1502. Additionally, some operations in the process may be unnecessary, for example, it may be carried out directly by the operator to determine whether the news is ambiguous and ignore the intermediate operations.

According to the sentences containing terminologies in information marked as ambiguous or non-ambiguous, the sentences are divided into phrases. A group of elements are obtained including terminologies, words used with the terminologies and relative position information. These elements are formatted to form an element set, which is used to train the ambiguity analysis model (1511).

$$\text{Model}_{stock}(\text{stock, sentence}) = \begin{cases} \text{ambiguous} \\ \text{non-ambiguous} \end{cases}$$

This ambiguity analysis model may be used to determine the ambiguity of a particular news about a particular stock name in the ambiguity analysis model automatically.

The above description of the process of training the ambiguity analysis model provides merely exemplary embodiments, and should not be understood as the only embodiments. Obviously, those skilled in the art, after understanding the basic principles of training the ambiguity analysis model, may modify the form and details of the method and operations of training the ambiguity analysis model without departing from the principles. Such modifications and variations are still within the scope of the present disclosure described herein.

Figure 16:
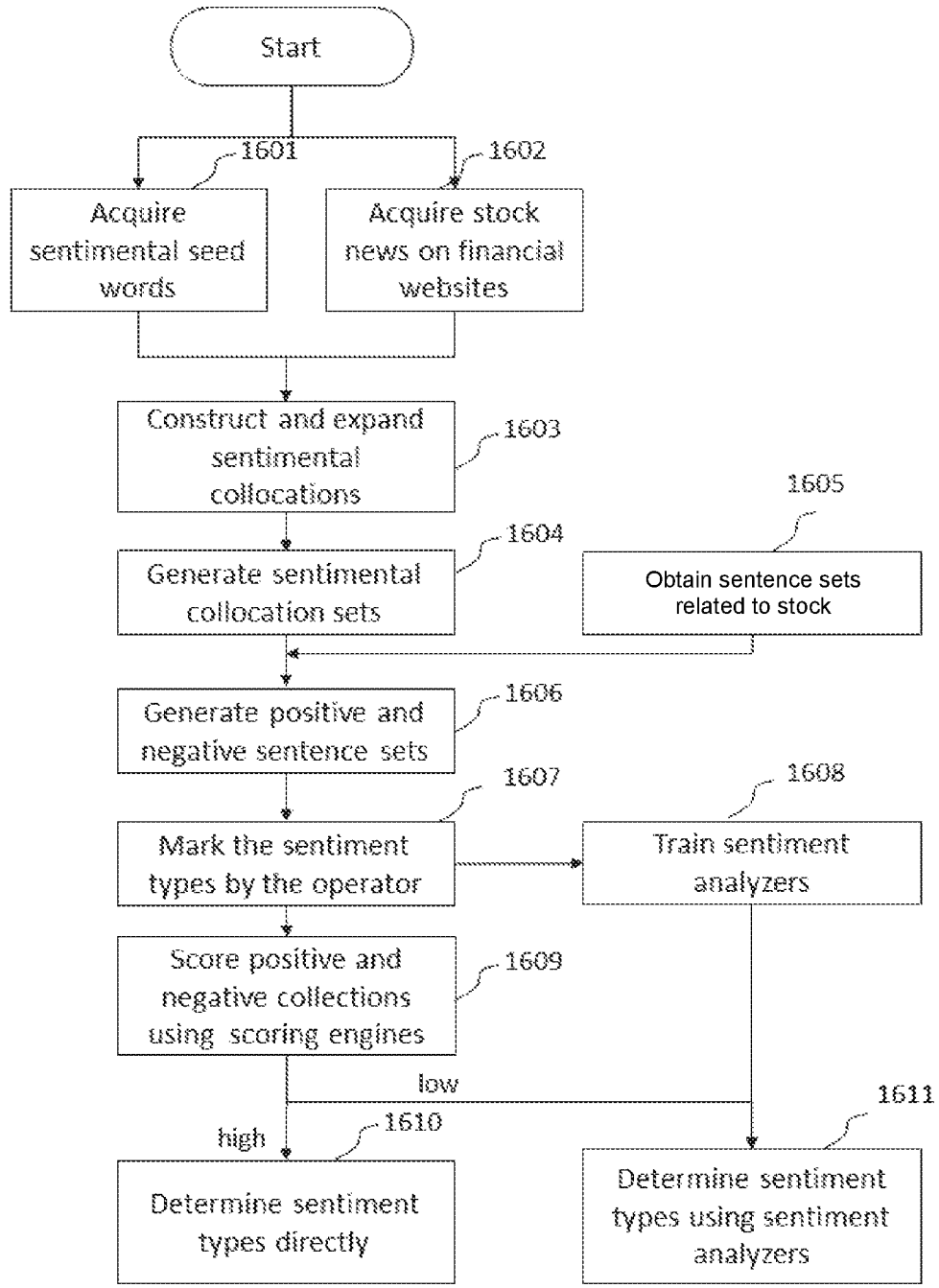
FIG. 16 is a flowchart illustrating a process for a sentiment analysis of a financial product according to some embodiments of the present disclosure.

FIG. 16 is a flowchart illustrating a process for a sentiment analysis of a financial product according to some embodiments of the present disclosure. The system may acquire a sentimental seed word in 1601. The sentimental seed word may include but not be limited to a positive word, a negative word, for example, fine, excellent, raise, good, increase, gain, rise, compensatory growth, earning, limit up, soaring profits, reduce, decrease, sharply decline, delayed fall, go down, loss, pay for, lose, limit down, reduce holdings, decline, or the like. Meanwhile, the system may acquire stock news from different financial websites (1602). The system may process sentimental seed words and the stock news to construct and expand sentimental collocations (1603). The sentimental collocations may be expanded by regularly visiting reputable financial websites and acquiring stock news. Sentimental collocation sets may be generated after the system expands the sentimental words and sentimental collocations (1604). On the other hand, a sentence with low correlation or an ambiguous sentence may be filtered out to obtain a non-ambiguous stock sentence set after the stock news is verified by an operator or automatically (1605). The system may match the non-ambiguous stock sentence set to the sentimental collocation sets to analyze a sentiment type of the non-ambiguous stock sentence set. A positive and negative sentence set may be generated after matching (1606). The positive and negative sentence set may be verified by the operator. After being verified, a sentence may be marked as positive, negative, or neutral (1607). The neutral sentence may be sent to the sentiment analyzer to train the sentiment analyzer (1608). An algorithm used by the sentiment analyzer may include but not be limited to a maximum entropy model, a support vector machine algorithm, a Naive Bayes model, or the like. After the training, the sentiment analyzer may be used to analyze the sentiment type of a neutral sentence (1611). The positive and negative sentences may be further analyzed in terms of sentiment types by a scoring engine (1609). The scoring engine may assess the matching results to obtain a score. A high score may indicate that the stock sentence or stock sentence set contains one or more strong sentimental collocations, and the sentence or the sentence set may be determined as positive or negative directly (1610). A low score may indicate that the stock sentence or the stock sentence set does not contain any strong sentimental collocations, and the sentence with the low score may be sent to the sentiment analyzer to determine its sentiment type (1611).

The above description provides merely exemplary embodiments, and should not be understood as the only embodiments. Obviously, those skilled in the art, after understanding the basic principles, may modify the form and details of the method and operations without departing from the principles. Such modifications and variations are still within the scope of the present disclosure described herein.

Figure 17:
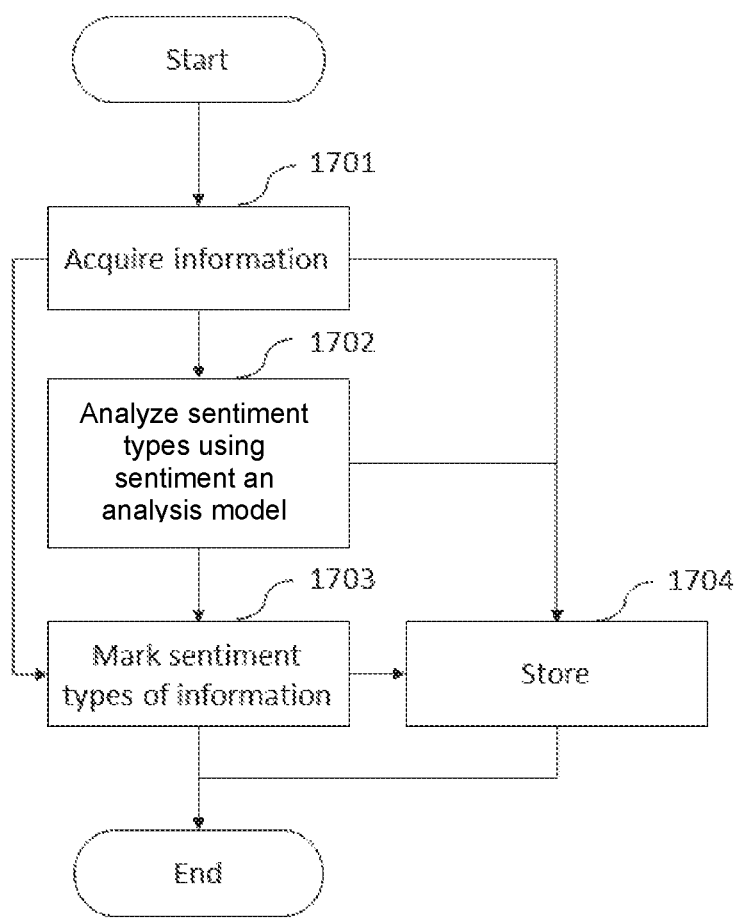
FIG. 17 is a flowchart illustrating a process for a sentiment analysis according to some embodiments of the present disclosure.

FIG. 17 is a flowchart illustrating a process for a sentiment analysis according to some embodiments of the present disclosure. The system may acquire information in 1701. The information may include but not be limited to non-ambiguous information and/or ambiguous information after an ambiguity analysis, unmarked information that has been subjected to a sentiment analysis but has not been marked with a sentiment type, or original information. The information obtained may be stored in, for example, the database 104 (1704). The unmarked information after the sentiment analysis may be marked with its sentiment type directly (1703). The non-ambiguous information and ambiguous information may be transmitted to the sentiment analyzer to classify the sentiment type. The information may be stored in database 104 after received by the sentiment analyzer. An algorithm used by the sentiment analyzer may include but not be limited to a maximum entropy model, a support vector machine algorithm, a Naive Bayes model, or the like. First of all, the sentiment analyzer may analyze the non-ambiguous information and ambiguous information to determine whether a strong sentimental collocation exists in the information, if the strong sentimental collocation exists in the information, the sentiment analyzer may determine the sentiment type of the information directly (1702), and then marks the information with its sentiment type (1703). If there is no strong sentimental collocation in the information, the scoring engine of the sentiment analyzer may score the sentiment type of the information to determine its sentiment type according to the score. After the sentiment analysis, the system may mark the information with its sentiment type (1703). The information may be stored in the database 104 after being marked.

It should be noted that the above description provides merely exemplary embodiments, and should not be understood as the only embodiments. Obviously, those skilled in the art, after understanding the basic principles, may modify the form and details of the method and operations without departing from the principles. Such modifications and variations are still within the scope of the present disclosure described herein.

Figure 18:
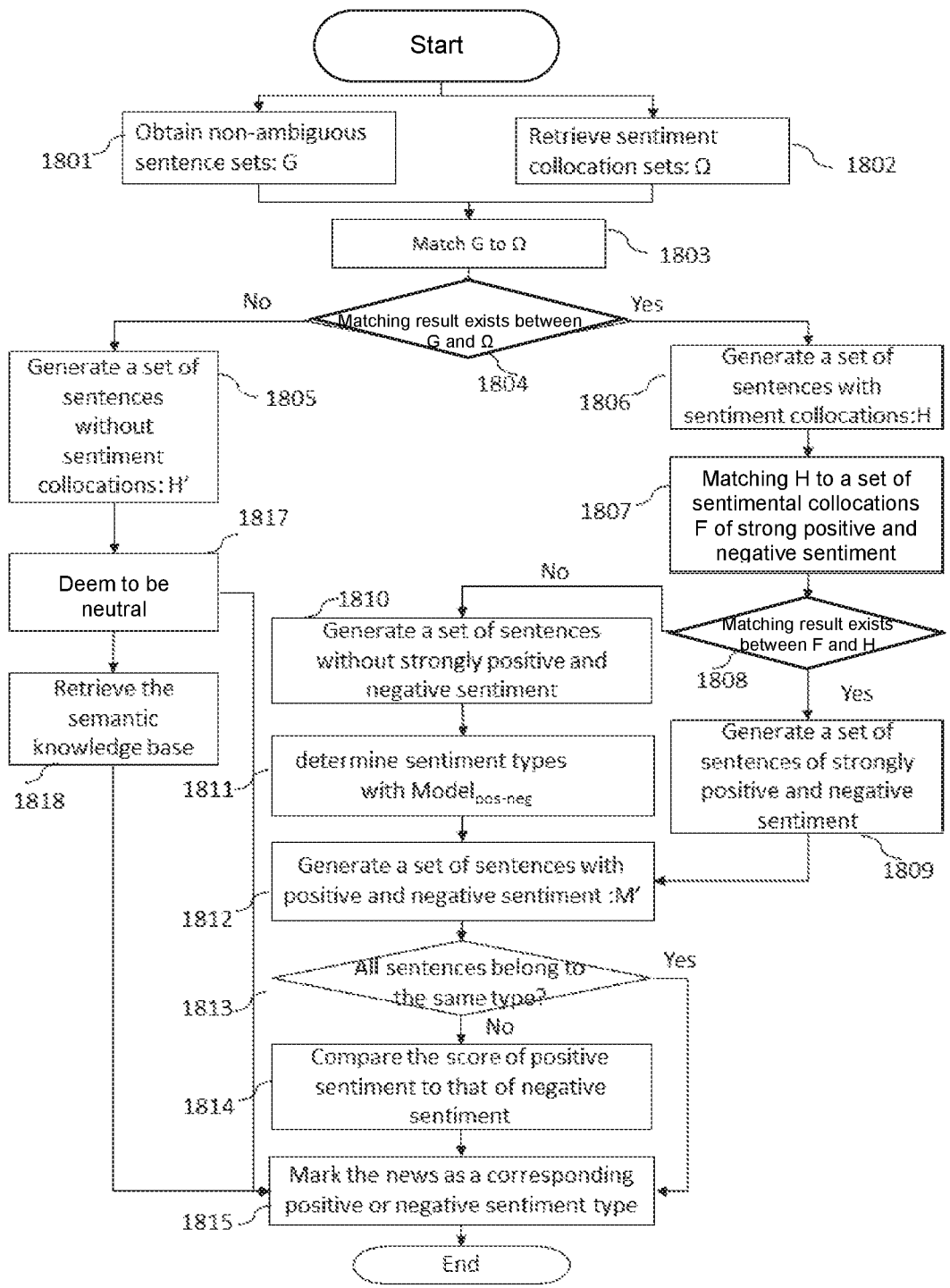
FIG. 18 is a flowchart illustrating a process for a sentiment analysis according to some embodiments of the present disclosure.

FIG. 18 is a flowchart illustrating a process for a sentiment analysis according to some embodiments of the present disclosure. The system may acquire a non-ambiguous sentence set G (1801). The operation 1801 may be performed by the acquisition unit 307 of the sentiment analysis module 306 by way of accessing the storage unit 315. Meanwhile, the system may retrieve a sentimental collocation set Ω (1802). The operation 1802 may be performed by the processing unit 309 of the sentiment analysis module 306 by way of accessing the sentimental collocation library 507 in the database 104. The system may match the non-ambiguous sentence set G to the sentimental collocation set Ω (1803). The operation 1803 may be performed by the matching unit 308 of the sentiment analysis module 306. The operation 1804 may be a logical judgment: if the non-ambiguous sentence set G matches the sentimental collocation set Ω, a set of sentences with sentimental collocations H may be generated (1806); otherwise, a set of sentences without sentimental collocations H' may be generated (1805). The system may match the set H to a set of sentimental collocations of strong positive and negative sentiment F (1807). The set F may include but not be limited to sets of words with a sentimental matching accuracy exceeding a particular threshold (e.g., the accuracy is more than 90%). The operation 1807 may be performed by the matching unit 308. The matching result may be logically judged in 1808 and the set H may be classified into a set of sentences of strongly positive and negative sentiment (1809) and a set of sentences without strongly positive and negative sentiment (1810). The sentiment analyzer 311 of the sentiment analysis module 306 may determine the sentiment type of the sentences without strongly positive and negative sentiment (1811). The algorithm used by the sentiment analyzer 311 may include but not be limited to a maximum entropy model, a support vector machine algorithm, a Naive Bayes model, a decision tree algorithm, or the like. After the classification, the system may generate a set of sentences containing positive and negative sentiment M' (1812). The operation 1813 may conduct logical judgment to determine whether all the sentences belong to the same kind of sentiment type. If all the sentences belong to the same kind of sentiment type, the system may mark the news as a positive or negative sentiment type accordingly (1815). The operation 1815 may be performed by the processing unit 309. If the sentences in the set M' contain two or more sentiment types, the processing unit 309 of the sentiment analysis module 306 may compare a score of positive sentiment with a score of negative sentiment (1814), and then marks M' with the sentiment type of the higher score (1815). The algorithm may meet the following conditions. Firstly, a positive or a negative level of strong collocations may be defined by an operator, and the positive or negative level is an element influencing the score. Secondly, another factor to be considered may be a distance between strong collocations and a stock name. Thirdly, if a final determination of the sentiment type is conducted according to a model, the score given based on the model needs to be lower than a score given according to any strong rules. Finally, positive and negative collocations in a title may score higher than those existing anywhere else (e.g., main body of the news). After the classification of set H, the system may mark the set of sentences with a corresponding sentiment type (1815), and may show to a user the classified news. The set H' without sentimental collocations may be marked as neutral (1817), and may be showed to the user as neutral news. It should be noted that, after the sentence have been marked as neutral, the system may retrieve the semantic knowledge library 512 to conduct a second sentiment analysis (1818). The operation 1818 may be performed by the sentiment analysis module 306. The semantic knowledge library 512 may recognize sentences, phrases or paragraphs with sentimental expressions from natural language without sentimental collocations. Merely by way of example with respect to the sentence "Today my husband and I filed for a divorce, he wanted to take custody of the children from me," there are no sentimental collocations in the sentence, and so a common sentiment analysis method may be unable to determine the sentiment type of this sentence. The semantic knowledge library 512 may allow the system to determine the sentiment type of this sentence. After the second sentiment analysis by the semantic knowledge library 512, the system may mark the sentence with a corresponding sentiment type (1815). After the sentiment analysis, the system may display the sentiment type(s) of the whole news or the sentiment type(s) of the contents concerning a particular or several financial products in a news report covering the same kind or different kinds of financial products.

Operations of the above described method may be carried out simultaneously or in any suitable order under suitable conditions. Additionally, an individual operation may be omitted from any method without departing from the principles and scopes of the above described method. Aspects of the above described embodiments may be combined with aspects of the above described any other embodiments to generate further embodiments without losing the effects being sought.

Figure 19:
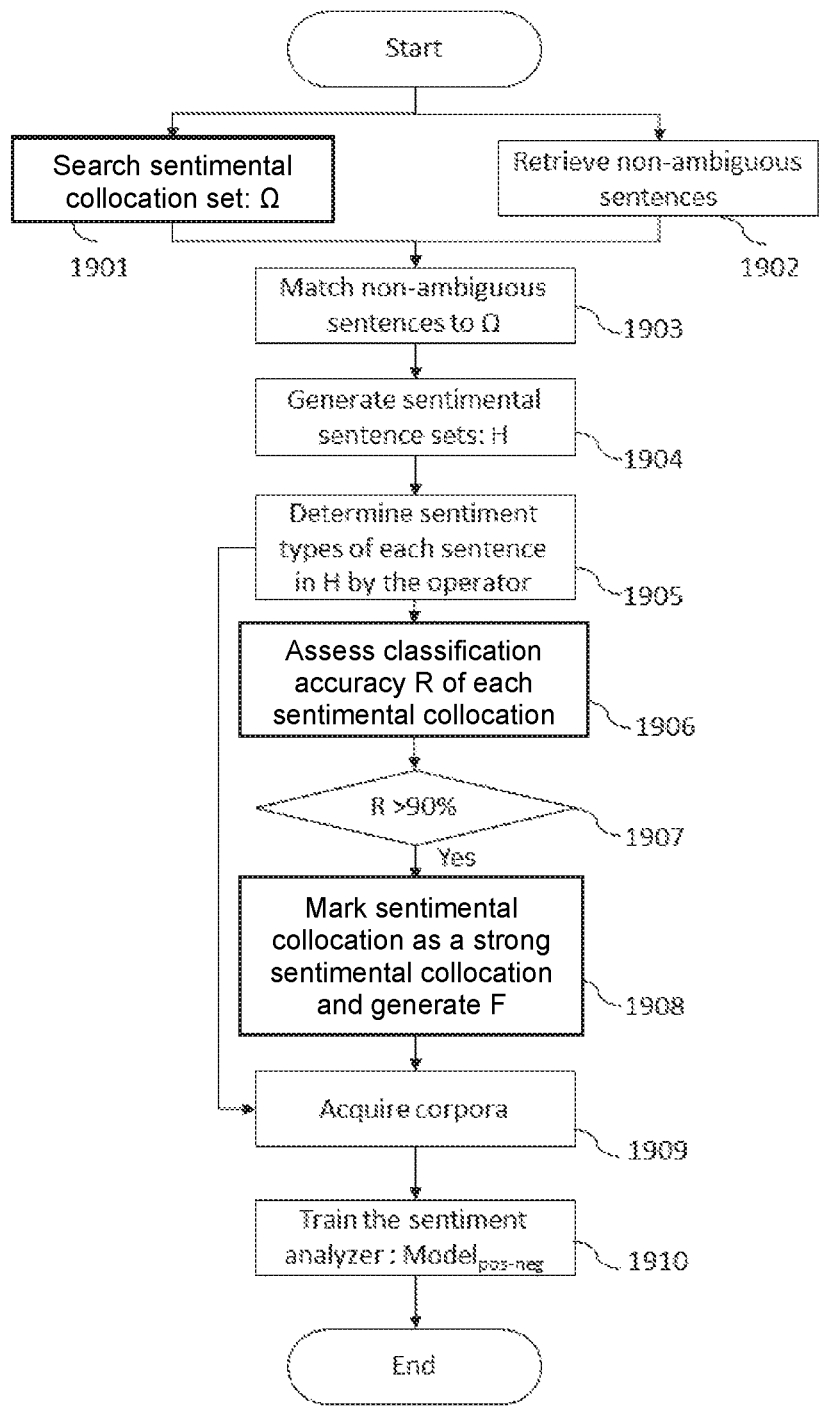
FIG. 19 is a flowchart illustrating a process for training a sentiment analysis model according to some embodiments of the present disclosure.

FIG. 19 is a flowchart illustrating a process for training a sentiment analysis model according to some embodiments of the present disclosure. First of all, the system may collect and construct a seed sentiment dictionary from a source, and the process may be performed by the acquisition module 101. The source may include but not be limited to literature (a book, a newspaper, journals, a patent, a thesis, an official document, or the like), an academic report, a market report, news, comments, an online dictionary, and an existing dictionary in a field, a research report, a notice, a product manual, a website of a relevant company, etc. Information may be retrieved in a centralized manner or in a distributed manner, locally or remotely, in a wired connection or wirelessly, manually or automatically, or a combination thereof.

Based on the seed sentiment dictionary, the system may further acquire information from a source to expand the sentiment dictionary and the sentimental collocations. The process of acquiring information may be performed by the acquisition unit 201 of the acquisition module 101. The source may include but not be limited to literature (a book, a newspaper, journals, a patent, a thesis, or an official document), an academic report, a market report, news, comments, an online dictionary, and an existing dictionary of a field, a research report, a notice, a product manual or a website of relevant companies. Information may be retrieved in a centralized manner or in a distributed manner, locally or remotely, via a wired connection or wirelessly, manually or automatically, or a combination thereof. The algorithms used may include but not be limited to a PMI algorithm, a log-likelihood ratio algorithm, a chi-square test, a cosine method, a dice coefficient and F-measure, or the like, or a combination thereof.

The system may obtain the sentimental collocations set Ω (1901) and the non-ambiguous sentence (1902) by collecting the information. It should be noted that, the sentimental collocations set Ω may be retrieved by operation as shown in this embodiment, or in a single operation.

The sentiment analysis module 306 may match the non-ambiguous sentences to Ω (1903), and a sentence set generated from matching is marked as sentimental sentences set H (1904). The matching may be performed manually or automatically. The algorithm used may include but not be limited to a regular expression algorithm.

Each sentence of the sentimental sentences set H may be determined and marked as the positive type, the negative type, or the neutral type by an operator (1905). After verified by the operator, the sentimental sentences set classified by the operator may be stored in the corpus acquisition unit 310 (1909). The system may automatically assess number of sentences in the set H marked as a positive/negative/neutral sentiment type matched by each sentimental collocations, and determine a classification accuracy R for each sentimental collocation (1906). In some embodiments, the classification accuracy of each sentimental collocation may be determined based on the following formula:
The classification accuracy for positive sentiment type of a particular sentimental collocation, $$R1 = \frac{\text{The number of sentences marked as a positive sentiment type matched by the particular ssentiment collocation}}{\text{The number of sentences matched by the particluar sentiment collocation in set } H} \times 100\%. \quad (003)$$

By analogy, R2 and R3, which may represent the classification accuracy for negative and neutral sentiment type of a particular sentimental collocation, respectively, may be obtained.

Each classification accuracy of a particular sentimental collocation may be compared with a default threshold (in this example the default threshold is 90%) (1907). If the classification accuracy of a particular sentimental collocation is more than 90%, the particular sentimental collection may be marked as a strong sentimental collocation. For example, if R1, the classification accuracy for the positive sentiment type of a particular sentiment collection in H, is more than 90%, the sentimental collocation may be marked as a strong positive sentimental collection directly. The system may retrieve all strong sentimental collocations to obtain a strong sentimental collocation set F (1908). The set F may be stored in the corpus acquisition unit 310 (1909). The definition of the strong sentimental collocations set F may be shown as below:

$$F=\{\emptyset|\text{precision}(æ)>90\%; \emptyset \in \Omega\}.$$

After the corpus acquisition unit completes the corpus acquisition, the element set in the corpus acquisition unit may be used to train the sentiment analyzer. The corpus acquisition may be performed real-time or periodically.

The sentences in the set H may be marked with corresponding sentiment types (1905), which may also be used as corpuses to train the sentiment analyzer (1910). The algorithm used by the sentiment analyzer may be a supervised learning algorithm including without limitation to a maximum entropy model, a Naïve Bayes model, a support vector machine algorithm, a non-negative matrix tri-factorization model, a genetic algorithm, and a K-nearest neighbor model. The features used in the supervised learning algorithm may include but not be limited to an the number of occurrences of a word, a part of a speech where the word appears, a relative position of the word, dependency between different words, an abstract feature of the word (e.g., a vector the word generates based on non-supervised learning). The algorithm used by the sentiment analyzer may be shown as the following formula:

$$\text{Model}_{pos\text{-}neg}(\text{stock, sentence}) = \begin{cases} \text{negative} \\ \text{positive} \\ \text{neutral} \end{cases}.$$

FIG. 20 is a block diagram illustrating a user interface according to some embodiments of the present disclosure. FIG. 20 may illustrate a user interface for displaying information of different categories. The user interface may be displayed on a peripheral device. The peripheral device may include but not be limited to a mobile device, a cell phone, a laptop, a tablet computer, a wearable device, a smart appliance, a smart vehicle, an intelligent instrument and equipment. In some embodiments, a graphic interface may be used for displaying different categories, and for displaying information related to a user's search criteria divided into a positive sentiment type, a negative sentiment type, and a neutral sentiment type.

The above description provides merely exemplary embodiments of displaying in different categories, and should not be understood as the only embodiments. Obviously, those skilled in the art, after understanding the basic principles, may modify the form and details of the method and operations without departing from the principles. Such modifications and variations are still within the scope of the present disclosure described herein.

We claim:
1. A device, comprising:
a non-transitory computer readable storage medium storing executable instructions; and
at least one processor in communication with the non-transitory computer readable storage medium, wherein when executing the executable instructions, the at least one processor is configured to cause the device to:

obtain a user input via an interface of the device, wherein the interface includes a conversational interface;

send, over a network, the user input to a system;

receive, over the network from the system, non-ambiguous information obtained based on an ambiguity analysis performed by the system on information retrieved based on the user input, the non-ambiguous information containing the user input; and display the non-ambiguous information on the interface of the device.

2. The device of claim 1, wherein the ambiguity analysis performed by the system on the information comprises:

constructing a keyword lexicon by retrieving terminologies from the information and storing the terminologies in the keyword lexicon; and conducting the ambiguity analysis of the information based on the keyword lexicon.

3. The device of claim 2, wherein the conducting the ambiguity analysis of the information based on the keyword lexicon comprises:

constructing a repository by storing the information in the repository;

matching the information in the repository with the terminologies in the keyword lexicon to obtain matching results;

scoring the matching results to obtain scores based on the terminologies in the keyword lexicon; and identifying the non-ambiguous information or ambiguous information from the information according to the scores.

4. The device of claim 3, wherein the identifying the non-ambiguous information or ambiguous information from the information according to the scores comprises:

determining an information as the ambiguous information if a score of the information is no more than a first threshold;

determining the information as the non-ambiguous information if the score of the information is no less than a second threshold;

determining the information as the non-ambiguous information or the ambiguous information by an operator or by an ambiguity analysis model if the score of the information is more than the first threshold and less than the second threshold.

5. The device of claim 4, wherein the ambiguity analysis model comprises a Maximum entropy algorithm training model.

6. The device of claim 4, wherein the first threshold or the second threshold are fixed.

7. The device of claim 4, wherein the first threshold or the second threshold are adjustable based on an amount of the information.

8. The device of claim 1, wherein the ambiguity analysis performed by the system on the information comprises:

obtaining an ambiguity analysis model; and conducting the ambiguity analysis of the information using the ambiguity analysis model.

9. The device of claim 8, wherein the obtaining the ambiguity analysis model comprises:

acquiring training information;

constructing a training lexicon by retrieving terminologies from the training information and storing the terminologies in the training lexicon, constructing a training repository by storing the training information in the training repository, matching and scoring the training information in the training repository with the training lexicon to obtain matching results, scoring the matching results to obtain scores based on the terminologies in the training lexicon, recognizing a set of training ambiguous information and a set of non-ambiguous training information according to the scores, retrieving a corpus from the set of ambiguous training information and the set of non-ambiguous training information, and obtaining the ambiguity analysis model by training the ambiguity analysis model with the corpus.

10. The device of claim 1, wherein each of the non-ambiguous information is marked with a sentimental type of one or more sentimental types.

11. The device of claim 10, wherein the display the non-ambiguous information on the interface of the device, the at least one processor is configured to cause the device further to:

divide the interface into different categories, each category corresponding to a sentimental type of the one or more sentimental types; and display the non-ambiguous information marked with a sentimental type on corresponding category based on the sentimental type.

12. The device of claim 10, wherein the non-ambiguous information is marked by the system in the following steps:

conducting a sentimental analysis of the non-ambiguous information to obtain sentimental types of the non-ambiguous information; and marking the non-ambiguous information with the sentimental types.

13. The device of claim 12, wherein the conducting a sentimental analysis of the non-ambiguous information comprises:

constructing a non-ambiguous repository by storing the non-ambiguous information in the non-ambiguous repository;

constructing a sentiment lexicon by retrieving sentimental words or sentimental collocations from the non-ambiguous information and storing the sentimental words or sentimental collocations in the sentiment lexicon;

retrieving a sentimental collocation set from the sentiment lexicon;

matching the non-ambiguous information with the sentimental collocation set to obtain a set of sentences with the sentimental collocations or a set of sentences without the sentimental collocations; and analyzing the set of sentences with the sentimental collocations or the set of sentences without the sentimental collocations to obtain sentimental types of the non-ambiguous information.

14. The device of claim 10, wherein the sentimental type is determined using a sentiment analyzer, the sentiment analyzer comprising at least one of a Maximum entropy algorithm training model or a support vector machine (SVM) model.

15. The device of claim 10, wherein the at least one processor is configured to cause the device further to:

obtain a second user input via the interface of the device;

send, over the network, the second user input to the system;

receive, over the network from the system, second non-ambiguous information marked with a sentimental type of the one or more sentimental types, the second non-ambiguous information containing the second user input;

display a comparison of a number of information marked with a same sentimental type of the one or more sentimental types between the user input and the second user input.

16. The device of claim 1, wherein the interface comprises a field of interest added by the user as a shortcut associated with a sentimental type of the one or more sentimental types.

17. The device of claim 1, wherein the interface comprises a plurality of favorites configured to collect one or more pieces of the non-ambiguous information.

18. The device of claim 1, wherein the interface comprises a default user interface or a user defined interface.

19. A method implemented on a device comprising a storage and a processor, comprising:

obtaining a user input via an interface of the device, wherein the interface includes a conversational interface;

sending, over a network, the user input to a system;

receiving, over the network from the system, non-ambiguous information obtained based on an ambiguity analysis performed by the system on information retrieved based on the user input, the non-ambiguous information containing the user input; and displaying the non-ambiguous information on the interface of the device.

20. A non-transitory computer readable medium embodying a computer program product, the computer program product comprising instructions configured to cause a device to:

obtain a user input via an interface of the device, wherein the interface includes a conversational interface;

send, over a network, the user input to a system;

receive, over the network from the system, non-ambiguous information obtained based on an ambiguity analysis performed by the system on information retrieved based on the user input, the non-ambiguous information containing the user input; and display the non-ambiguous information on the interface of the device.

* * * * *